(12) United States Patent
Delp et al.

(10) Patent No.: US 11,770,354 B2
(45) Date of Patent: Sep. 26, 2023

(54) FACILITATING CROSS-ORGANIZATION COMMUNICATIONS

(71) Applicant: Salesforce, Inc., San Francisco, CA (US)

(72) Inventors: Shanan Delp, San Francisco, CA (US); Christopher Sullivan, Wellesley, MA (US); Jaron Moore, Brooklyn, NY (US); Kevin Marshall, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/167,407

(22) Filed: Feb. 10, 2023

(65) Prior Publication Data

US 2023/0269211 A1    Aug. 24, 2023

Related U.S. Application Data

(63) Continuation of application No. 17/572,191, filed on Jan. 10, 2022, now Pat. No. 11,582,178, which is a
(Continued)

(51) Int. Cl.
*H04L 51/212* (2022.01)
*H04W 4/12* (2009.01)
(Continued)

(52) U.S. Cl.
CPC ............ *H04L 51/212* (2022.05); *H04L 51/18* (2013.01); *H04L 51/56* (2022.05); *H04W 4/06* (2013.01); *H04W 4/12* (2013.01)

(58) Field of Classification Search
CPC ....... H04L 51/212; H04L 51/56; H04L 51/18; H04W 4/06; H04W 4/12
(Continued)

(56) References Cited

U.S. PATENT DOCUMENTS

| 7,610,339 B2 | 10/2009 | Evans et al. |
| 7,707,249 B2 | 4/2010 | Spataro et al. |

(Continued)

FOREIGN PATENT DOCUMENTS

| JP | 2003030101 A | 1/2003 |
| JP | 2003219047 A | 7/2003 |

(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Melvin H Pollack
(74) *Attorney, Agent, or Firm* — Lee & Hayes, P.C.

(57) ABSTRACT

Techniques are described for expediting a generation of a means of communication between two people associated with different organizations. A first person associated with a communication platform may submit a request to the communication platform to generate an invitation to communicate via the communication platform. The first person may provide the invitation to a second person directly or via the communication platform. Responsive to receiving an indication that the second person has accepted the invitation, the communication platform may generate the means of communication between the first person and the second person. The communication platform may update respective user interfaces to include the means of communication. The communication platform may process messages and/or data between the first person and the second person that is input (Continued)

on the respective user interface and sent via the means of communication.

20 Claims, 14 Drawing Sheets

Related U.S. Application Data continuation of application No. 17/170,639, filed on Feb. 8, 2021, now Pat. No. 11,223,590, which is a continuation of application No. 16/852,202, filed on Apr. 17, 2020, now Pat. No. 10,951,564.

(51) Int. Cl.
*H04L 51/56* (2022.01)
*H04W 4/06* (2009.01)
*H04L 51/18* (2022.01)

(58) Field of Classification Search
USPC .......................................................... 709/206
See application file for complete search history.

(56) References Cited

U.S. PATENT DOCUMENTS

| | | | |
|---|---|---|---|
| 7,882,178 B2 | 2/2011 | Lingafelt et al. | |
| 8,600,027 B1 | 12/2013 | Doerr et al. | |
| 8,621,585 B2 | 12/2013 | Danieli et al. | |
| 8,655,672 B2 | 2/2014 | Bhan et al. | |
| 8,676,792 B1 | 3/2014 | Scatamacchia et al. | |
| 8,719,904 B2 | 5/2014 | Bertin et al. | |
| 8,738,714 B2 | 5/2014 | Setton | |
| 8,856,236 B2 | 10/2014 | Moore et al. | |
| 8,874,770 B2 | 10/2014 | Ruff et al. | |
| 9,032,033 B2 | 5/2015 | Gronowski et al. | |
| 9,209,992 B2 | 12/2015 | Nelke et al. | |
| 9,270,453 B2 | 2/2016 | King et al. | |
| 9,396,456 B1 | 7/2016 | Wang et al. | |
| 9,426,156 B2 | 8/2016 | Hebert et al. | |
| 9,449,091 B1 | 9/2016 | Rao et al. | |
| 9,483,448 B2 | 11/2016 | Pirnazar | |
| 9,600,669 B2 | 3/2017 | Filman et al. | |
| 9,654,425 B2 | 5/2017 | Heiferman et al. | |
| 9,819,803 B2 | 11/2017 | Logan et al. | |
| 9,820,152 B2 | 11/2017 | Myers et al. | |
| 9,853,980 B2 | 12/2017 | Radier et al. | |
| 9,887,946 B2* | 2/2018 | Yang | H04L 12/1818 |
| 9,973,552 B2 | 5/2018 | Lappin | |
| 10,021,059 B1 | 7/2018 | Rao | |
| 10,033,702 B2 | 7/2018 | Ford et al. | |
| 10,104,034 B1 | 10/2018 | Coullon et al. | |
| 10,116,995 B2 | 10/2018 | Eklund et al. | |
| 10,264,095 B2 | 4/2019 | La Rotonda et al. | |
| 10,269,033 B2 | 4/2019 | Znerold et al. | |
| 10,282,740 B1 | 5/2019 | Bramwell et al. | |
| 10,311,037 B2 | 6/2019 | Turim et al. | |
| 10,313,294 B2 | 6/2019 | Maczka et al. | |
| 10,348,731 B2 | 7/2019 | Jayaram et al. | |
| 10,389,765 B2 | 8/2019 | Zeng et al. | |
| 10,397,391 B1 | 8/2019 | Czajka et al. | |
| 10,404,636 B2 | 9/2019 | Rodriguez et al. | |
| 10,430,051 B2 | 10/2019 | Zeng et al. | |
| 10,455,291 B2 | 10/2019 | Bernstein et al. | |
| 10,510,035 B2 | 12/2019 | Fadell et al. | |
| 10,530,723 B2 | 1/2020 | Milligan et al. | |
| 10,540,638 B2 | 1/2020 | Agarwal et al. | |
| 10,547,575 B2* | 1/2020 | Cohen | H04L 51/18 |
| 10,565,276 B2 | 2/2020 | Finder | |
| 10,579,969 B2 | 3/2020 | Johnson et al. | |
| 10,616,278 B1 | 4/2020 | Johansson et al. | |
| 10,616,369 B1 | 4/2020 | d'Andrea et al. | |
| 10,673,912 B2 | 6/2020 | Touchen et al. | |
| 10,681,095 B1 | 6/2020 | Wang et al. | |
| 10,720,001 B1 | 7/2020 | Grosberg | |
| 10,721,225 B1 | 7/2020 | Baszucki et al. | |
| 10,728,187 B2 | 7/2020 | Roy et al. | |
| 10,737,169 B1 | 8/2020 | Tilaye et al. | |
| 10,783,573 B2 | 9/2020 | Eubanks | |
| 10,785,809 B1 | 9/2020 | Thubert et al. | |
| 10,904,481 B1 | 1/2021 | Morris et al. | |
| 10,904,749 B2 | 1/2021 | Circosta et al. | |
| 11,005,990 B2 | 5/2021 | Kats et al. | |
| 11,017,416 B2 | 5/2021 | Kopikare et al. | |
| 11,120,409 B1 | 9/2021 | Worth | |
| 11,171,898 B2* | 11/2021 | Barbitta | G06Q 30/0244 |
| 11,184,400 B2* | 11/2021 | Montazeri | H04L 67/52 |
| 11,196,700 B1* | 12/2021 | Hercules | H04L 67/306 |
| 11,233,832 B2* | 1/2022 | Chauhan | G06F 3/0483 |
| 11,237,692 B2* | 2/2022 | Han | G06F 3/0481 |
| 11,283,857 B2 | 3/2022 | Ziebell et al. | |
| 11,368,575 B2* | 6/2022 | Kats | H04M 3/42042 |
| 11,381,610 B2* | 7/2022 | Le Strat | H04L 65/403 |
| 11,411,900 B2* | 8/2022 | Boyd | H04L 51/224 |
| 11,424,995 B1 | 8/2022 | Cartsonis et al. | |
| 11,438,282 B2* | 9/2022 | Cotner | H04L 63/0428 |
| 11,468,895 B2* | 10/2022 | Yoshioka | G06Q 10/10 |
| 11,489,883 B2* | 11/2022 | Vanderheeren | H04M 3/563 |
| 11,494,741 B1* | 11/2022 | Schemers | H04L 51/08 |
| 11,522,825 B2* | 12/2022 | Khosrowshahi | H04L 12/1827 |
| 11,552,813 B2* | 1/2023 | Barzilay | H04L 12/1822 |
| 2002/0078150 A1 | 6/2002 | Thompson et al. | |
| 2007/0192410 A1 | 8/2007 | Liversidge et al. | |
| 2010/0017619 A1 | 1/2010 | Errico | |
| 2010/0299763 A1 | 11/2010 | Marcus et al. | |
| 2013/0254296 A1 | 9/2013 | Lai et al. | |
| 2013/0298006 A1 | 11/2013 | Good et al. | |
| 2013/0326362 A1 | 12/2013 | Murray et al. | |
| 2014/0052485 A1 | 2/2014 | Shidfar | |
| 2014/0096033 A1 | 4/2014 | Blair | |
| 2014/0344718 A1 | 11/2014 | Rapaport et al. | |
| 2015/0067077 A1 | 3/2015 | DiSano et al. | |
| 2015/0081532 A1 | 3/2015 | Lewis et al. | |
| 2015/0100503 A1 | 4/2015 | Lobo et al. | |
| 2015/0201162 A1 | 7/2015 | Griffin et al. | |
| 2015/0288701 A1 | 10/2015 | Brand | |
| 2016/0036872 A1 | 2/2016 | Lappin | |
| 2016/0127282 A1 | 5/2016 | Nezarati et al. | |
| 2016/0212230 A1 | 7/2016 | Schneider et al. | |
| 2017/0278155 A1 | 9/2017 | Li et al. | |
| 2017/0329922 A1 | 11/2017 | Eberting et al. | |
| 2017/0351476 A1 | 12/2017 | Yoakum | |
| 2017/0353508 A1 | 12/2017 | Yoakum | |
| 2018/0239959 A1 | 8/2018 | Bui et al. | |
| 2018/0287982 A1 | 10/2018 | Draeger et al. | |
| 2018/0294986 A1 | 10/2018 | Vidro et al. | |
| 2018/0302357 A1 | 10/2018 | Cohen | |
| 2019/0068390 A1 | 2/2019 | Gross et al. | |
| 2019/0180248 A1 | 6/2019 | Byun et al. | |
| 2019/0197231 A1 | 6/2019 | Meier | |
| 2019/0273627 A1 | 9/2019 | Whalin et al. | |
| 2019/0319900 A1 | 10/2019 | Marlow et al. | |
| 2019/0370457 A1 | 12/2019 | Shultz et al. | |
| 2019/0394206 A1 | 12/2019 | Zezza | |
| 2020/0100165 A1 | 3/2020 | Hosier, Jr. | |
| 2020/0228610 A1 | 7/2020 | Fisher et al. | |
| 2020/0285684 A1 | 9/2020 | Halikka et al. | |
| 2020/0329005 A1 | 10/2020 | Anerella et al. | |
| 2020/0338456 A1 | 10/2020 | Atli et al. | |
| 2020/0357246 A1 | 11/2020 | Nelson et al. | |
| 2020/0358645 A1 | 11/2020 | Li et al. | |
| 2021/0037064 A1 | 2/2021 | Casey et al. | |
| 2021/0211317 A1 | 7/2021 | Khan et al. | |
| 2021/0211477 A1 | 7/2021 | Stephenson | |
| 2021/0234827 A1 | 7/2021 | Waldman et al. | |
| 2021/0328957 A1 | 10/2021 | Delp et al. | |
| 2022/0109645 A1* | 4/2022 | Delp | H04L 63/108 |
| 2022/0210104 A1 | 6/2022 | Delp et al. | |

(56) References Cited

U.S. PATENT DOCUMENTS

2023/0099324 A1* 3/2023 Wahl .................. G06F 3/04842
715/751

FOREIGN PATENT DOCUMENTS

| | | |
|---|---|---|
| JP | 2020030851 A | 2/2020 |
| WO | WO2016139977 A1 | 9/2016 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), LEXISNEXIS, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", FUJITSU Sci. Tech. J., 36, 2, (Dec. 2000) pp. 154-161.

Office Action for U.S. Appl. No. 16/948,939, dated Apr. 20, 2021, Delp, "Limited Functionality Interface for Communication Platform", 38 Pages.

Office Action for U.S. Appl. No. 16/852,202, dated Jun. 24, 2020, Delp, "Direct Messaging Instance Generation", 10 pages.

Office Action for U.S. Appl. No. 16/948,939, dated Nov. 18, 2021, Delp, "Limited Functionality Interface for Communication Platform", 37 Pages.

Office Action for U.S. Appl. No. 16/948,939, dated Dec. 11, 2020, Delp, "Limited Functionality Interface for Communication Platform", 32 Pages.

Office Action for U.S. Appl. No. 16/948,939, dated Mar. 30, 2022, Delp, "Limited Functionality Interface for Communication Platform", 32 Pages.

Oikarinenr J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

The International Preliminary Report on Patentability dated Oct. 27, 2022 for PCT Application No. PCT/US2021/027130, 10 pages.

PCT Search Report and Written Opinion for PCT/US2021/027130, dated Jul. 26, 2021, 16 pgs.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

Translation of Japanese Office Action dated Apr. 18, 2023 for Japanese Patent Application No. 2022-555123, a foreign counterpart of U.S. Pat. No. 10,951,564, 9 pages.

* cited by examiner

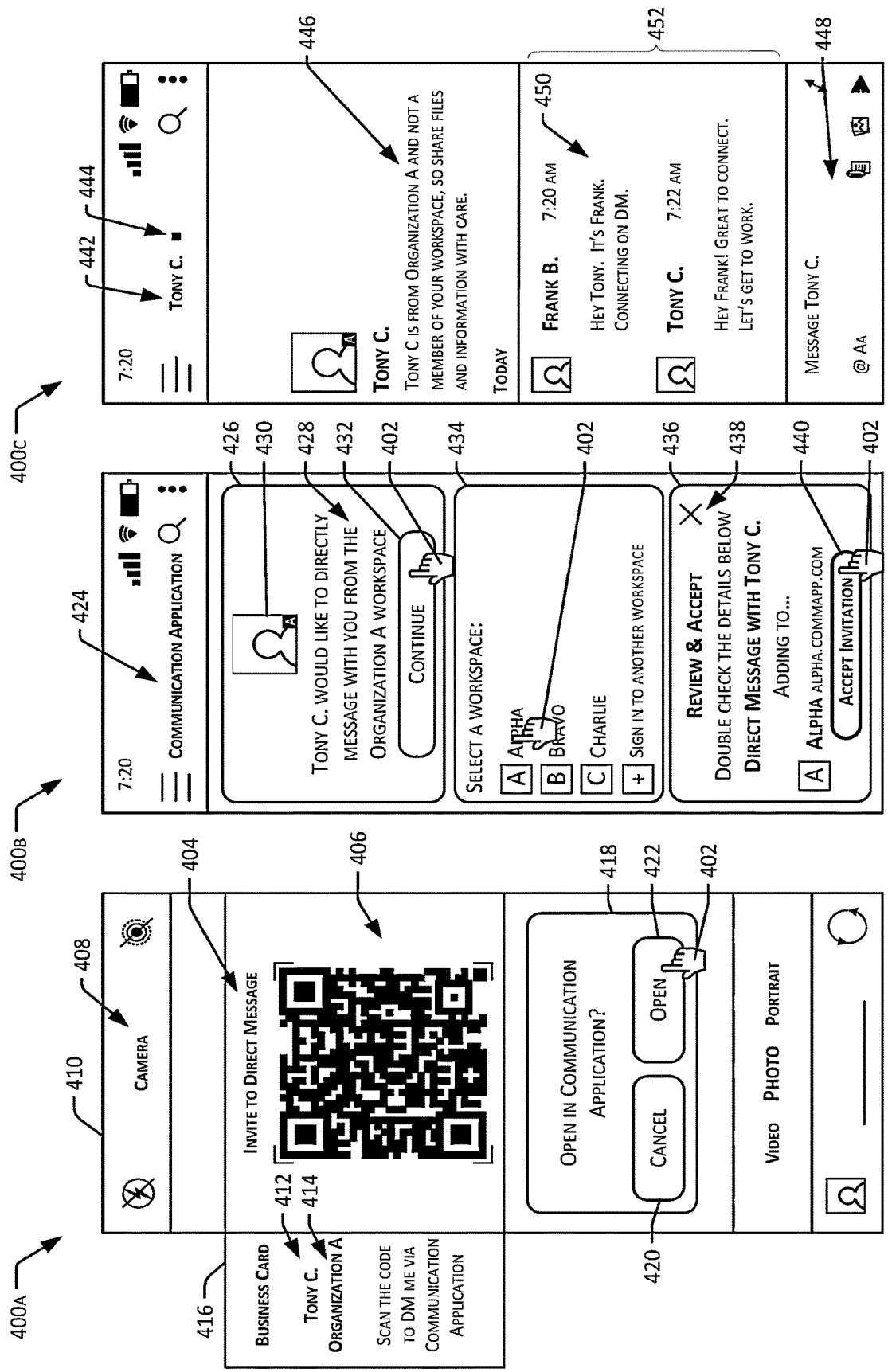

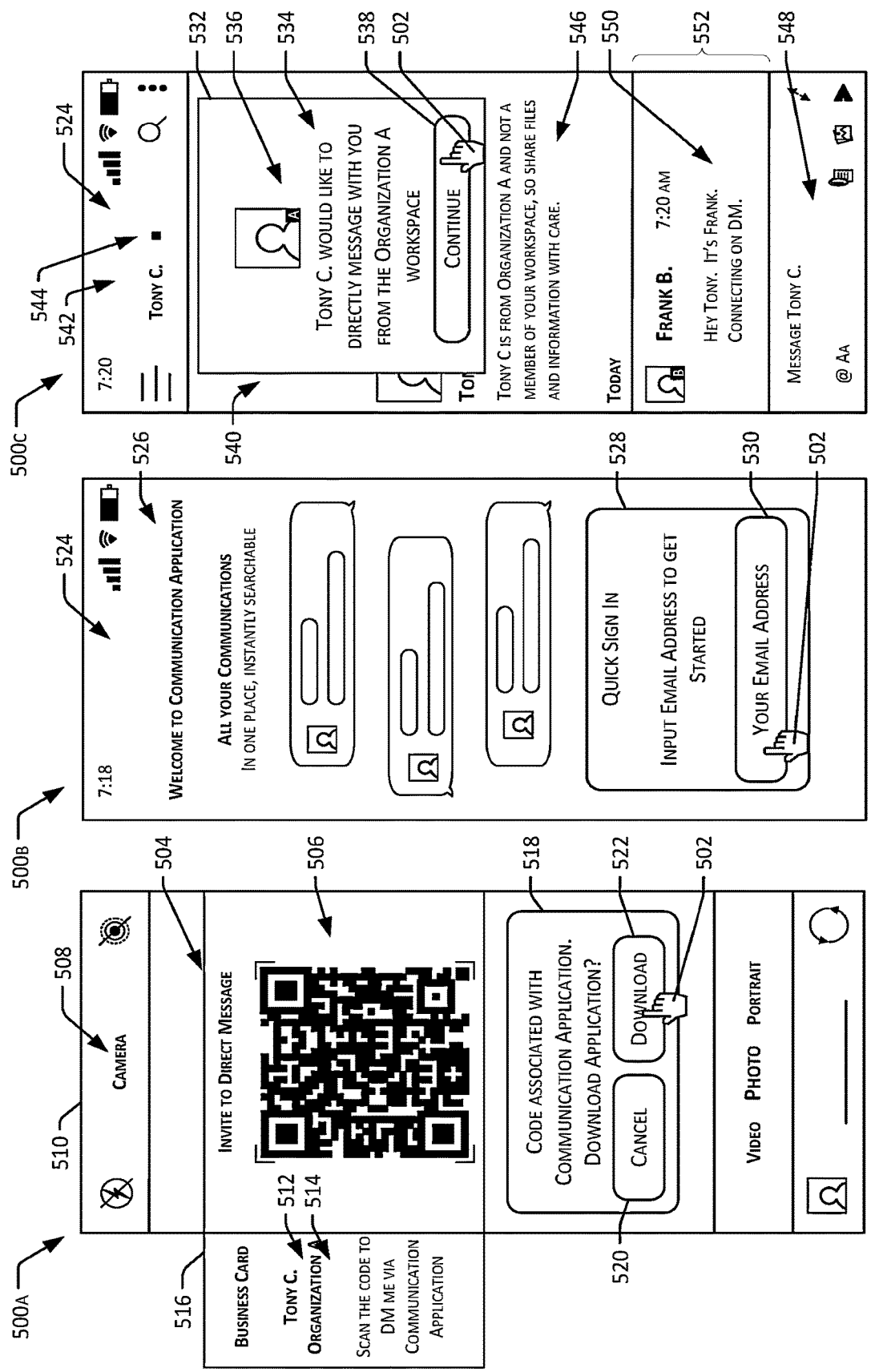

900 ⟶

```
┌─────────────────────────────────────────────────────────────────────────┐
│ RECEIVE, AT A FIRST TIME FROM A FIRST COMPUTING DEVICE ASSOCIATED WITH  │
│ A FIRST USER, A FIRST INSTRUCTION TO GENERATE AN INVITATION             │
│ TO COMMUNICATE VIA A DIRECT MESSAGING INSTANCE                          │
│ 902                                                                     │
└─────────────────────────────────────────────────────────────────────────┘
                                    ↓
┌─────────────────────────────────────────────────────────────────────────┐
│ GENERATE THE INVITATION BASED AT LEAST IN PART ON THE FIRST INSTRUCTION │
│ 904                                                                     │
└─────────────────────────────────────────────────────────────────────────┘
                                    ↓
┌─────────────────────────────────────────────────────────────────────────┐
│ SEND THE INVITATION TO A SECOND COMPUTING DEVICE ASSOCIATED WITH A      │
│ SECOND USER                                                             │
│ 906                                                                     │
└─────────────────────────────────────────────────────────────────────────┘
                                    ↓
┌─────────────────────────────────────────────────────────────────────────┐
│ RECEIVE, AT A SECOND TIME AFTER THE FIRST TIME AND FROM THE FIRST       │
│ COMPUTING DEVICE, A SECOND INSTRUCTION TO REVOKE THE INVITATION         │
│ 908                                                                     │
└─────────────────────────────────────────────────────────────────────────┘
                                    ↓
┌─────────────────────────────────────────────────────────────────────────┐
│ RECEIVE, AT A THIRD TIME AFTER THE SECOND TIME, A REQUEST TO ENABLE     │
│ DIRECT MESSAGING COMMUNICATIONS WITH THE FIRST USER                     │
│ 910                                                                     │
└─────────────────────────────────────────────────────────────────────────┘
                                    ↓
┌─────────────────────────────────────────────────────────────────────────┐
│ CAUSE A NOTIFICATION THAT THE INVITATION HAS BEEN REVOKED TO BE         │
│ PRESENTED ON A DISPLAY ASSOCIATED WITH THE SECOND COMPUTING DEVICE      │
│ 912                                                                     │
└─────────────────────────────────────────────────────────────────────────┘
```

FIG. 9

FACILITATING CROSS-ORGANIZATION COMMUNICATIONS

PRIORITY

This application is a continuation of and claims priority to commonly assigned, U.S. patent application Ser. No. 17/572,191, filed Jan. 10, 2022, which is a continuation of U.S. patent application Ser. No. 17/170,639, filed Feb. 8, 2021, now U.S. Pat. No. 11,223,590 issued Jan. 11, 2022, which is a continuation of U.S. patent application Ser. No. 16/852,202, filed on Apr. 17, 2020, now U.S. Pat. No. 10,951,564 issued Mar. 16, 2021. Application Ser. Nos. 17/572,191, 17/170,639 and 16/852,202 and U.S. Pat. Nos. 11,223,590 and 10,951,564 are fully incorporated herein by reference.

TECHNICAL FIELD

Communication platforms are becoming increasingly more popular for facilitating work-related communications, such as for project collaboration within a single organization and across two or more organizations. Many communication platforms require administrator approval for cross organization communications, to ensure appropriate people are collaborating on projects. However, the administrative approval process may be lengthy and may result in delays in communication. For example, an administrator for an organization may evaluate every request from a member of the organization to communicate with people from other organizations. The evaluation process may be time consuming and may delay communications between the member of the organization and the people from the other organizations. The delayed communications may result in lost work time on a project or the member seeking alternative, less secure means of communication, such as electronic mail or the like.

Additionally, members associated with a communication platform may desire to collaborate with others who are not associated with the communication platform. However, the onboarding process to some communication platforms may be onerous and time consuming. For initial contact with potential collaborators, the member and/or the potential collaborators may not be willing to invest the additional time in establishing long-term communication links via the communication platform. Thus, the members may again seek the alternative, lightweight means of communication during an initial contact.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4A-4C illustrate example interfaces corresponding to a user associated with a communication platform accepting an invitation to communicate via a direct messaging instance.

FIGS. 5A-5C illustrate example interfaces corresponding to a user associating with a communication platform and accepting an invitation to communicate via a direct messaging instance associated with the communication platform.

FIG. 9 illustrates an example process for revoking an invitation to communicate via a direct messaging instance, utilizing the techniques described herein.

DETAILED DESCRIPTION

Figure 1:
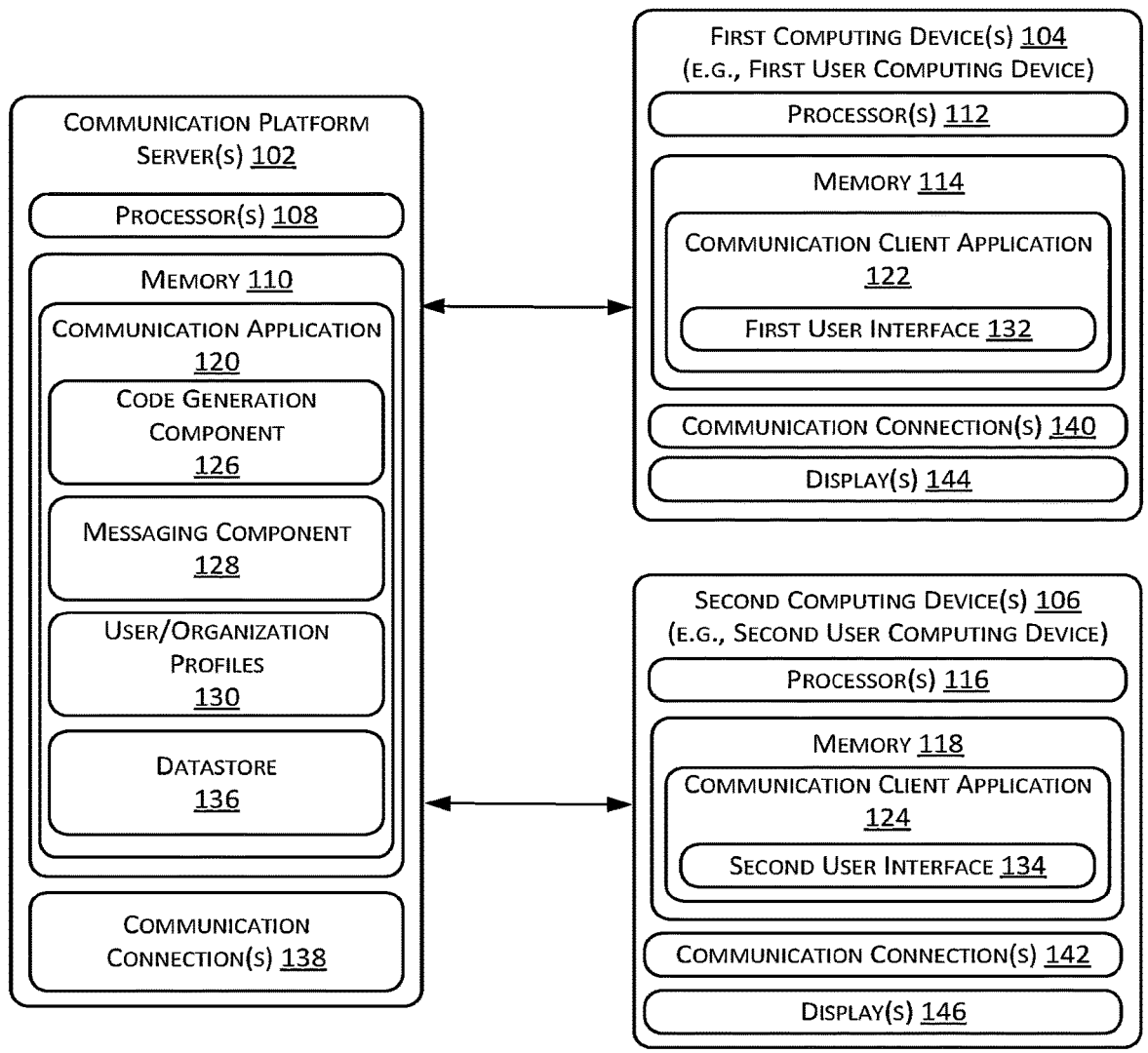
FIG. 1 illustrates a block diagram illustrating an example system of computing devices usable to implement example techniques described herein.

This application describes techniques for expediting the generation of a direct messaging instance between two people associated with different organizations, to facilitate communication and collaboration, resulting in a decreased reliance on the other means of communication and increasing communication security and/or privacy. For example, a first person may be associated with a communication platform and may submit a request to the communication platform to generate an invitation to communicate via a direct messaging instance. The first person may provide the invitation to a second person directly (e.g., in person or via email) or via the communication platform. Responsive to receiving an indication that the second person has accepted the invitation, the communication platform may generate a direct messaging instance between the first person and the second person. The communication platform may cause a first user interface associated with the first user and a second user interface associated with the second user to be updated with the direct messaging instance. The communication platform may process messages between the first person and the second person via the direct messaging instance included in their respective user interfaces. In some examples, the direct messaging instance may have a limited duration and may expire after a period of time. In some examples, during the period of time that the direct messaging instance is enabled for direct messaging communications, the first user and/or the second user may request to upgrade the direct messaging instance to a shared communication channel with an unlimited duration.

The techniques described herein improve performance of a user computing device by reducing a number of applications and/or programs running thereon for multi-party project collaboration. As discussed above, many people utilize communication platforms to collaborate with others across two or more organizations. People collaborating on a project may communicate via a communication application managed by the communication platform. The communication application may provide an efficient and secure means of communicating and storing information associated with the project. At times, the people collaborating on the project may seek out input from other people, such as those associated with a different organization. However, due to the onerous administrative approval and/or onboarding process associated with communicating via the communication application with people from outside organizations who are not previously vetted, the parties may seek out alternative means of communication, such as electronic mail (email), text message, social networking messages, or the like, at least at the inception of a collaborative effort. The alternative means of communication may require processing power and memory to continually update on the user computing device concurrently with the communication application. Due to the ease of establishing a new direct messaging instance between parties of different organizations, the techniques described herein may improve the user computing device by reducing an amount of processing power and memory required to collaborate on the project.

Moreover, the techniques described herein improve privacy and security associated with messaging with new people. As stated above, due in part to the approval and/or onboarding process associated with a communication application with people from outside organizations who are not previously vetted, the parties may seek out alternative means of communication. These alternative means of communication, such as electronic mail (email), text message, social networking messages, and the like, may not include enhanced security and/or privacy protocols, such as those associated with the communication application. As such, the alternate means of communication may not be as secure as communications via the communication application. Accordingly, enabling a quick and efficient means by which communications may be established via the secure communication application may improve the privacy and security associated with the information transmitted between users.

Additionally, the techniques described herein improve performance of one or more computing devices by reducing an amount of content sent over a network. For instance, in a traditional communication platform system, to receive input from a non-vetted collaborator (e.g., not approved by an administrator) a user may send an email or request for the input via another method of communication. The user may then upload the information to the communication platform, such as to share with other members of a group collaborating on the project. Unlike the traditional methods, which require the data to be sent via a network at least twice, once via email and once via the communication platform, the techniques described herein provide a means by which a new collaborator may be easily connected with a person working on a project via a communication platform, such as to transfer data once over the communication platform. Thus, the techniques described herein may reduce the amount of content (e.g., email messages, etc.) sent over the network. As such, the quantity of data sent over the network may be reduced and the amount of bandwidth available may be increased.

Furthermore, the techniques described herein provide a better user experience for users associated with a communication platform. As discussed above, traditionally, the administrative approval and/or onboarding (e.g., joining, associating with the communication platform) processes may be lengthy and time consuming for those associated with the communication platform and, in some instances, for those onboarding to the communication platform. The techniques described herein provide an expedited means of establishing a direct messaging instance, to enable communications via the communication platform without the lengthy and time-consuming processes described above. At least because of the expedited direct messaging instance establishment, the techniques described herein may provide an enhanced user experience.

These and other aspects are described further below with reference to the accompanying drawings. The drawings are merely example implementations and should not be construed to limit the scope of the claims. For example, while some examples are illustrated in the context of a user interface for a mobile device, the same or similar techniques may be implemented using any computing device and the user interface may be adapted to the size, shape, and configuration of the particular computing device.

FIG. 1 illustrates a block diagram illustrating an example system 100 of computing devices usable to implement example techniques described herein. For example, FIG. 1 illustrates example computing devices including communication platform server(s) 102, one or more first computing devices 104, and one or more second computing devices 106, that interact over a network. By way of example and not limitation, the communication platform server(s) 102 may be representative of servers used to implement a communication platform system, the first computing device(s) 104 may be representative of a first user device associated with a first user, and the second computing device(s) 106 may be representative of a second user device associated with a second user.

The communication platform server(s) 102 may comprise one or more individual servers or other computing devices that may be physically located in a single central location or may be distributed at multiple different locations. The communication platform server(s) 102 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

Each of the computing devices described herein may include one or more processors and/or memory. Specifically, in the illustrated example, communication platform server(s) 102 include one or more processors 108 and memory 110, first computing device(s) 104 include one or more processors 112 and memory 114, and second computing device(s) 106 include one or more processors 116 and memory 118. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory may comprise one or more non-transitory computer-readable media and may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

As shown in FIG. 1, communication platform server(s) 102 includes a communication application 120, first computing device(s) 104 includes communication client application 122, and second computing device(s) 106 includes communication client application 124 that enables interaction of content among the computing devices via the communication platform server(s) 102. For example, content (e.g., messages including text, images, audio, video, etc.) can be shared among users associated with user accounts of an online communication network provided by the communication platform system and may include sharing content in accordance with a user account that is restricted, such as based on a type of account, organizational preferences, or the like. In some examples, the communication client application enables interfaces to access content, to view content, and to generate content as those described with reference to FIGS. 4A-7D for example. In particular examples, communication platform server(s) 102 send instructions to present, transmit, and receive content as discussed with reference to FIGS. 4A-7D.

FIG. 1 further illustrates communication platform server(s) 102 as including code generation component 126 and messaging component 128 to enable content such as messages, photos, and the like, to be shared among the computing devices. In various examples, the code generation component 126 may be configured to receive a request for an access code, such as from a first user associated with a first computing device 104, and to generate the access code. The access code may include a token linking the access code to the first user and/or a first user profile associated therewith. In various examples, the access code may include an initial time stamp associated with generation of the code. In some examples, the access code may be valid (e.g., active) for a pre-determined period of validity (e.g., 3 days, 7 days, etc.). In such examples, the period of validity may start at the initial time stamp associated with generation of the code. In some examples, the period of validity may start at a second time stamp associated with delivering the access code to at least one of the first computing device(s) 104 or the second computing device(s) 106.

In various examples, the code generation component may be configured to send the access code to the first computing device(s) 104. In such examples, the first user may distribute the access code and/or an associated invitation to direct message to the second user, such as in person, via email, text message, or the like. In some examples, the code generation component 126 may be configured to send the access code to the second computing device(s) 106. In some examples, the code generation component 126 may send the access code and/or associated invitation to direct message to the second computing device(s) 106 responsive to an instruction received from the first user. In some examples, the code generation component 126 may send the access code and/or associated invitation to direct message to the second computing device(s) 106 based on receiving user data associated with the second user (e.g., an email address, telephone number, social networking handle, etc.).

In various examples, the code generation component 126 may be configured to revoke a previously generated invitation and/or access code. In some examples, the code generation component 126 may revoke the previously generated invitation and/or access code based on an expiration of a period of validity associated therewith. In some examples, the code generation component 126 may revoke the previously generated invitation and/or access code based on an instruction to revoke received from the first user via the first computing device(s) 104.

In various examples, responsive to determining to revoke a previously generated invitation and/or access code (based on an expiration of a period of validity or an instruction from the first user), the code generation component 126 may modify and/or remove the token associating the first user with the invitation and/or the access code. In some examples, based on a determination to revoke the previously generated invitation and/or access code, code generation component 126 may associate an indication of invalidity with the invitation and/or the access code. In such examples, responsive to receiving an indication of an attempt to activate the access code, such as via the messaging component, the code generation component 126 may determine that the invitation and/or access code is no longer valid.

In various examples, the messaging component 128 may be configured to receive, from the second computing device 106, a request to enable direct messaging with the first user (e.g., user associated with an access code). The request may include an activation and/or selection of the access code. In some examples, responsive to receiving the request, the messaging component 128 may exchange process the token associated with the access code and identify the first user as being associated with the access code. In various examples, the messaging component 128 may verify that the access code is valid (e.g., time period associated with access code activation not expired, access code not revoked, etc.).

In various examples, the messaging component 128 may identify a second user associated with the request. In some examples, the second user may be identified based on a token associated with the invitation. In some examples, the first user may include user data associated with the second user in the request for the access code. In such examples, the code generation component 126 may include a token associating the second user with the access code. In some examples, the second user may be identified based on an Internet Protocol address associated with the request, a user device (e.g., identifier) associated with the request, or the like.

In some examples, the messaging component 128 may determine whether the second user is associated with the communication platform. In some examples, the messaging component 128 may determine the association based on a user account of the communication platform associated with the second user. In some examples, the messaging component 128 may determine the association based on an instance of the communication client application 124 being stored on the second computing device 106 associated with the second user.

In various examples, based on a determination that the second user is not associated with the communication platform, the messaging component 128 may send an invitation to join the communication platform to the second computing device 106. The invitation may include a means by which the second user may quickly and efficiently associate with the communication platform, such as to communicate with the first user via a direct messaging instance.

In some examples, based on a determination that the second user is associated with the communication platform, the messaging component 128 may verify that a user account associated with the second user and/or an organization associated with the second user authorizes direct messaging instances based on access codes. In various examples, the messaging component 128 may access a user and/or organization profile 130 associated with the second user to verify that the account and/or organization support the direct messaging instance. Based on a determination that the user account and/or organization do not support the direct messaging instance, the messaging component 128 may present an error notification informing the second user of the account and/or organizational restriction.

Based on a determination that the user account and/or organization support the direct messaging instance, the messaging component 128 may verify an intent to of the second user to communicate with the first user via a direct messaging instance. In some examples, the messaging component 128 may cause a selectable control to verify intent to present on a display of the second computing device 106. Responsive to receiving an indication of acceptance of the invitation (indication of intent to associate with the direct messaging instance), the messaging component 128 may generate the direct messaging instance. In some examples, the messaging component 128 may cause a first user interface 132 associated with the direct messaging instance to surface via the communication client application 122 and a second user interface 134 associated with the direct messaging instance to surface via the communication client application 124, such as to facilitate communications therebetween.

In various examples, the messaging component 128 may be configured to process messages between the first user and the second user via the direct messaging instance for a time period associated therewith. In some examples, the direct messaging instance may include an unlimited time period. In such examples, the messaging component 128 may process the messages via the direct messaging instance until at least one of a first user or a second user disables the direct messaging instance.

In various examples, the direct messaging instance may include a time period of activation. In some examples, the time period may include a pre-determined time period (e.g., 14 days, 30 days, etc.). In various examples, the pre-determined time period may be determined based on a user account associated with the first user and/or the second user. In such examples, the messaging component 128 may access a user and/or organization profile 130 associated with the user to determine the pre-determined time period. For example, the second user account may permit direct messaging instances to be active for 15 days. In some examples, the pre-determined time period may be determined based on organizational preferences corresponding to a first organization associated with the first user and/or a second organization associated with the second user. In such examples, the messaging component 128 may access user and/or organization profiles 130 associated with the first organization and/or the second organization to determine the pre-determined time period.

In some examples, the messaging component 128 may determine a time stamp associated with a generation of the direct messaging instance (e.g., a time associated with creation and/or delivery of an associated user interface to at least one of the first user or the second user). The messaging component 128 may determine a second time associated with deactivation of the direct messaging instance. The second time may include a time associated with an elapse of the pre-determined time period after generation and/or delivery of the direct messaging instance (e.g., time stamp associated with the generation, delivery, etc.).

Based on a determination that a current time is associated with the second time, the messaging component 128 may deactivate the direct messaging instance. In various examples, the messaging component 128 may disable one or more features of the first user interface 132 and/or second user interface 134 associated with the direct messaging instance. In some examples, the disabled feature(s) may include features associated with drafting messages, sending the messages, and/or sending files and/or other attachments via the direct messaging instance.

In various examples, the time period of activation of a direct messaging instance may correspond to a particular project in which the first user and the second user are associated. In some examples, the first user may provide an indication to the code generation component 126 that a particular access code is associated with a particular project. In some examples, the code generation component 126 may associate information about the particular project to the access code.

In some examples, upon activation of the access code by the second user, the messaging component 128 may determine the association of the direct messaging instance with the particular project based on the access code. In various examples, the messaging component 128 may access stored data associated with the particular project, such as to determine an end time associated therewith. In such examples, the messaging component 128 may determine a time in which to disable the direct messaging instance based on the end time associated with the particular project.

In some examples, the messaging component 128 may process messages via the direct messaging instance until a current time is associated with an end time of the particular project. In some examples, the messaging component 128 may process messages via the direct messaging instance until receiving an indication from the first computing device 104 or the second computing device 106 that the particular project is complete. In some examples, the indication may include an instruction to disable the direct messaging instance.

In various examples, the messaging component 128 may be configured to receive, via the user interface 132 and/or the second user interface 134, a request to generate a shared communication channel between the first organization of the first user and the second organization of the second user. In examples in which the second user associated with the communication channel responsive to receiving the invitation to send a direct message and/or the access code, the messaging component 128 may request additional information from the second user in response to receiving the request to generate the shared communication channel. In such examples, the additional information may include user data associated with upgrading an account of the user, such as to a full account that enables more functionality than messaging via the direct messaging instance.

The shared communication channel may include additional communication features not permitted by the direct messaging instance, such as communicating with people in two organizations in a channel where everyone in the channel can see the message without having to be directly messaged. For example, the shared communication channel may permit communications between a plurality of users associated with the first organization and a plurality of users associated with the second organization.

In some examples, the shared communication channel may include a communication channel of unlimited duration. In some examples, responsive to generating the shared communication channel, the messaging component 128 may modify a time period associated with the direct messaging instance to an unlimited time period.

In various examples, responsive to receiving the request to generate the shared communication channel, the messaging component 128 may send a request to approve the shared communication channel to a first administrator associated with the first organization and a second administrator associated with the second organization. Based on receiving a disapproval from either the first administrator or the second administrator, the messaging component 128 may cause a message indicating the channel was unable to be created to present via the first user interface 132 and/or the second user interface 134. Based on receiving approval from the first administrator and the second administrator, the messaging component 128 may generate the shared communication channel. The messaging component 128 may cause the communication client application 122 to update the first user interface 132 and the communication client application 124 to update the second user interface 134, to reflect the shared communication channel between the first organization and the second organization.

In some examples, the memory 110 may include one or more user and/or organization profiles 130. The user and/or organization profiles 130 may include user data and organization data, as described above. In various examples, the code generation component 126 and/or the messaging component 128 may access the user and/or organization profiles 130 to determine functionality supported by a respective account, preferences associated with direct messaging instances, and the like. In various examples, the direct messaging instance may be generated based at least in part on the user and/or organization profiles 130. For example, an organizational preference may restrict users from transferring files via direct messaging instances generated via access codes. The messaging component 128 may disable an attachment function associated with the first user interface 132 and/or the second user interface 134 corresponding to the direct messaging instance.

In various examples, the user and/or organization profiles 130 may include administrator data and/or security permissions corresponding to associated accounts. In some examples, the administrator data and/or security permissions may include an identity of an administrator associated with an account. In some examples, the administrator data and/or security permissions may include whether direct messaging instances based on access codes are authorized with the associated account. In some examples, based on a determination that direct messaging instances are authorized by a first organization, the communication platform server(s) 102, such as via the messaging component 128, may enable a feature on the first user interface 132 associated with a first user to request access codes. In some examples, based on a determination that direct messaging instances are not authorized by the first organization and/or are not authorized for the first user, the messaging component 128 may disable the feature on the first user interface 132.

Additionally, the memory 110 may include a datastore 136. In various examples, the datastore 136 may store messages and/or additional data sent via a direct messaging instance. In various examples, the datastore 136 may store any information for shared communication channels that were created via the direct messaging instance, such as the organization information, policies, users, and the like. In various examples, the datastore 136 may include data associated with active and inactive direct messaging instances. For example, a time period associated with a direct messaging instance may elapse. Based on the time period elapsing, the messaging component 128 may cause the direct messaging instance to be disabled, such that additional messages may not be transmitted or received via the direct messaging instance. The data associated with the direct messaging instance may be stored in the datastore 136, such as in an archive of disabled direct messaging instances.

As shown in FIG. 1, communication platform server(s) 102 include communications connection(s) 138, first computing device(s) 104 include communications connection(s) 140, and second computing device(s) 106 include communications connection(s) 142 that enable communication between at least the communication platform server(s) 102 and one or more of the first computing device(s) 104, and the second computing device(s) 106.

The communication connection(s) 138, 140, and/or 142 may include physical and/or logical interfaces for connecting communication platform server(s) 102, first computing device(s) 104, and/or second computing device(s) 106 to another computing device or a network, such as network(s) 114. For example, the communications connection(s) 138, 140, and/or 142 may enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

Additionally, the first computing device(s) 104 may include display(s) 144 and the second computing device(s) 106 may include display(s) 146. Depending on a type of computing device used as the first computing device(s) 104 and/or the second computing device(s) 106, the displays 144 and 146 may employ any suitable display technology. For example, the displays 144 and 146 may include liquid crystal displays, a plasma displays, a light emitting diode displays, OLED (organic light-emitting diode) displays, electronic paper displays, or any other suitable type of displays able to present digital content thereon. In some examples, the displays 144 and 146 may have a touch sensor associated therewith to provide a touchscreen display configured to receive touch inputs for enabling interaction with a graphical user interface presented on the displays 144 and 146. Accordingly, implementations herein are not limited to any particular display technology.

While FIG. 1 is provided as an example system 100 that can be used to implement techniques described herein, the techniques described and claimed are not limited to being performed by the system 100, nor is the system 100 limited to performing the techniques described herein.

Figure 2:
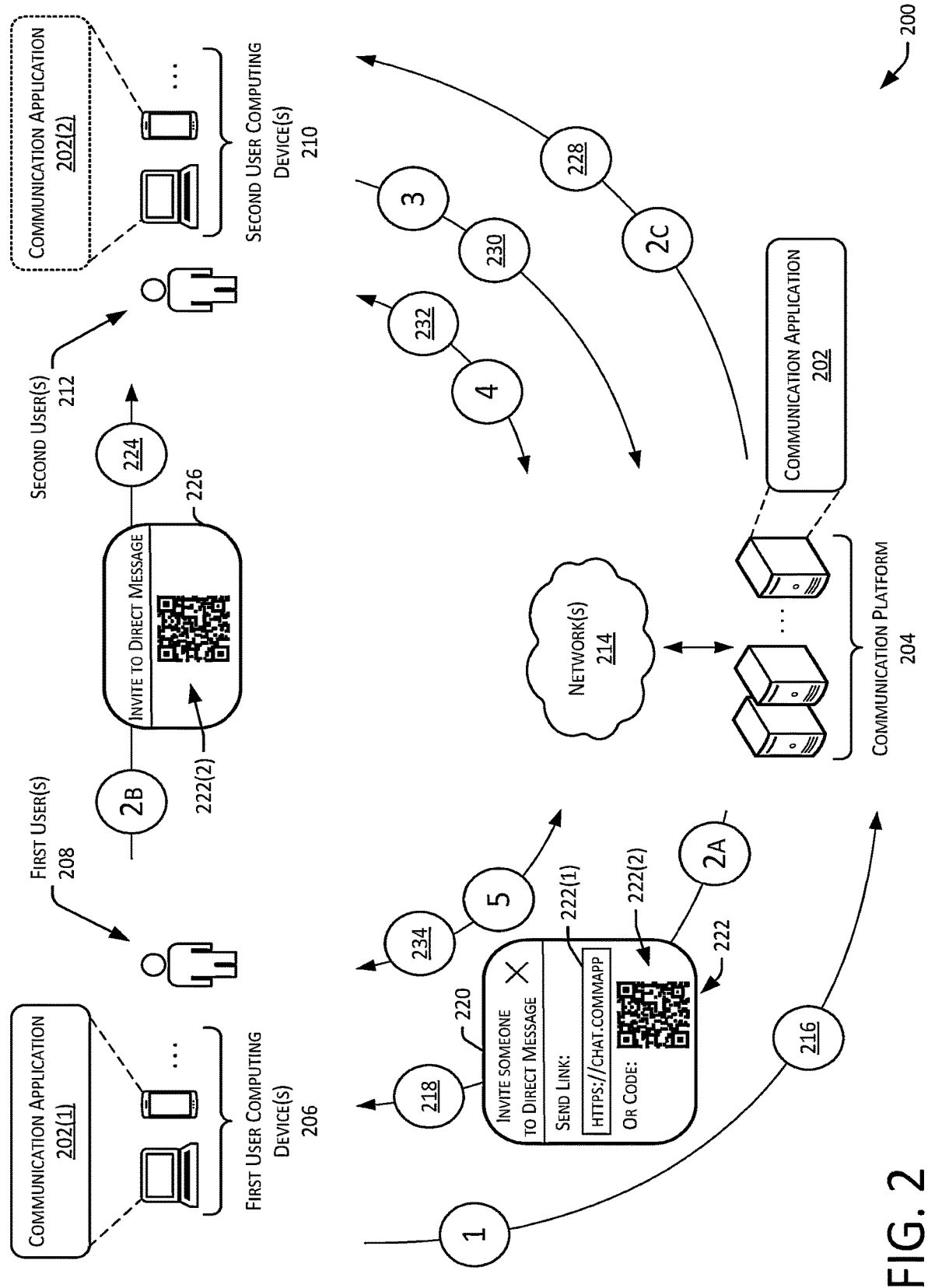
FIG. 2 is a schematic view of an example system usable to establish direct messaging instances between users associated with different organizations.

FIG. 2 is a schematic view of an example system 200 usable to implement the techniques described herein to expedite a generation of a direct messaging instance associated with a communication application 202, such as communication application 120, via the system 200. In some examples, the system may include a communication platform 204 configured to manage the communication application 202, such as to provide a means of messaging between one or more first user computing devices 206 (e.g., first user device(s) 206) associated with one or more first users 208 and one or more second user computing devices 210 (e.g., second user device(s) 210) associated with one or more second users 212. In some examples, the communication platform 204 is a channel-based messaging platform. In at least one example, the communication platform 204 may include one or more communication platform servers, such as communication platform server(s) 102. The first user device(s) 206 may include a first instance of the communication application 202(1), such as communication client application 122. In some examples, the second user device(s) 210 may include a second instance of the communication application 202(2), such as communication client application 124. In such examples, the second user(s) 212 may be associated with the communication platform 204. The second user(s) 212 may or may not be associated with the communication platform at a first time (e.g., prior to establishing communication with the first user(s) 208 via the communication platform). In examples in which the second user(s) 212 is not associated with the communication platform 204 at the first time, the second user computing device(s) 210 may not initially include the second instance of the communication application 202(2). For example, a first user 208 may invite the second user 212 communicate via a direct messaging instance. The second user 212, upon accepting the invitation to communicate, may download a second instance of the communication application 202(2) onto the second user computing device 210 or may access the second instance of the communication application 202 (2) via a web interface.

Each of the first user computing device(s) 206 and the second user device(s) 210 include one or more processors and memory storing computer executable instructions to implement the functionality discussed herein attributable to the respective computing devices. In some examples, the first user device(s) 206 and the second user device(s) 210 may include desktop computers, laptop computers, tablet computers, mobile devices (e.g., smart phones or other cellular or mobile phones, mobile gaming devices, portable media devices, etc.), or other suitable computing devices. The first user device(s) 206 and the second user device(s) 210 may execute one or more client applications, such as a web browser (e.g., Microsoft Windows Internet Explorer, Mozilla Firefox, Apple Safari, Google Chrome, Opera, etc.) or a native or special-purpose client application (e.g., communication applications, messaging applications, email applications, games, etc.), to access and view content over one or more networks 214.

The one or more network(s) 214 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the first user device(s) 206 and the second user device(s) 210 may access the communication platform 204 and/or communicate with one another.

The communication platform 204 may include one or more servers or other computing devices, any or all of which may include one or more processors and memory storing computer executable instructions to implement the functionality discussed herein attributable to the communication networking system or digital platform. The communication platform 204 may enable the first user(s) 208 and the second user(s) 212 to communicate with one another via the first instance of the communication application 202(1) on the first user device(s) 206 and the second instance of the communication application 202(2) on the second user device(s) 210. The communication platform 204 may manage the communication application 202, including the first instance of the communication application 202(1) and the second instance of the communication application 202(2), to facilitate communications between the first user(s) 208 and the second user(s) 212.

In various examples, the communication platform 204 may store user data associated with the first user(s) 208 and the second user(s) 212, such as in an account associated therewith. The user data may include a type of user (e.g., administrator, basic member, etc.), type of account associated with the user (e.g., free subscription, limited access, unlimited access, etc.), organization associated with the user, user preferences (e.g., nickname, photo, etc.), identifiers associated with the user (e.g., telephone number, IP address, email address, etc.), previous direct messaging threads, other conversations via channels, and the like. In various examples, the communication platform 204 may store organization data associated with one or more organizations associated with the first user(s) 208 and/or the second user(s) 212. The organization data may include an administrator identifier (e.g., name, account data, etc.), organizational preferences (e.g., direct messaging codes authorized, direct messaging codes not authorized, associated users permitted to generate codes, etc.), users associated with the organization, databases associated with the organization, and the like.

FIG. 2 illustrates an example in which, at operation 216, a first user 208 may request an access code associated with generating a direct messaging instance. The access code may include a unique identifier associated with generating a direct messaging instance with the first user 208. The access code may include a quick response (QR) code, a micro QR code, a uniform resource locator (URL), a bar code, or any other type of discrete code associated with the direct messaging instance with the first user 208. In various examples, the request may include a type of code (e.g., QR code, micro QR code, URL, barcode, other machine-readable code, etc.) to be generated.

In various examples, the request may include a generic request to generate an access code associated with the first user 208 communicating with one or more other users via a direct messaging instance. In such examples, the request may not include identifying information about an intended recipient of the access code (e.g., other potential communicating party is not identified). For example, the first user 208 may request an access code to print on a business card.

In various examples, the request may include second user data associated with a specific second user 212 for which the access code (and an associated invitation to direct message) is intended. The second user data may include a name, associated organization, contact information (e.g., an email address, telephone number, etc.), or any other data usable to identify and/or provide the access code. For example, the first user 208 may include a name and an email address associated with the second user 212 in the request. The communication platform 204 may identify the second user 212 based on the second user data (e.g., name and email address), or based on an assigned user name or identifier, for example.

In some examples, the request may include a means by which the access code will be provided to a second user 212. The means may include via email, a social networking message, or the like. In some examples, the communication platform 204 may determine the type of access code based on the means by which the access code will be provided. For example, the first user 208 may request for the communication platform 204 to send a request to an email associated with the second user 212. Based in part on the email delivery, the communication platform 204 may determine to generate a URL access code.

In various examples, the first user 208 may request the access code via a selectable control on a user interface associated with the first instance of the communication application 202(1). In some examples, the communication platform 204 may enable the selectable control on the first instance of the communication application 202(1) based in part on organization data or user data associated with the organization and/or the first user 208. In such examples, prior to enabling the selectable control, the communication platform 204 determines that the expedited direct messaging instance generation described herein is authorized by the organization and/or that the user account includes the feature. For example, the communication platform may determine that an organization associated with the first user 208 authorizes expedited direct messaging instance generation. The communication platform 204 may thus enable the selectable control via which the first user 208 may request the access code associated with generating the direct messaging instance.

In various examples, the communication platform 204 may generate the access code based on the request. In some examples, the communication platform 204 may generate two or more different types of access codes. In some examples, the communication platform 204 may generate a particular type of access code based on the data provided in the request (e.g., means of communication, requested type of code, etc.). In some examples, the communication platform 204 may generate the code based on a default setting. For example, the communication platform 204 may default to generating URL access codes in response to receiving requests. For another example, the communication platform 204 may default to generating QR codes in response to receiving the requests.

At operation 218, responsive to generating the access code, the communication platform 204 may send the access code to the first user 208. In some examples, the communication platform may send the access code via a user interface 220. In the illustrative example, the user interface 220 includes a first access code 222(1) (e.g., URL) and a second access code 222(2) (QR code). In other examples, the user interface 220 may include additional or alternative access codes 222.

In various examples, the first user device 206 may receive the one or more access codes 222 via the first instance of the communication application 202(1). At operation 224, the first user 208 may provide the access code(s) 222 to the second user 212. In some examples, the first user 208 may cause the access code(s) 222 to be presented via a display of the first user device 206 and may show the displayed access code(s) 222 to the second user 212. In such examples, the second user may scan or otherwise copy the displayed access code(s) 222, such as via the second user computing device 210. For example, the first user 208 may cause the second access code 222(2) to be presented on the display of the first user device 206 and may present the display to the second user 212. The second user 212 may scan the second access code 222(2) utilizing a camera of the second user device 210, such as to request to enable the direct messaging communications with the first user (e.g., by activating the QR code).

In various examples, the first user 208 may print or present on a display of the first user device 206 an invitation to direct message 226 including an access code 222, such as access code 222(2), and provide the invitation to direct message 226 to the second user 212 in person. In such examples, the second user 212 may utilize the second user device 210 to request to enable the direct messaging communications with the first user 208 based on the printed or presented access code(s) 222. For example, the invitation to direct message 226 may be included on a business card with a URL associated with direct messaging with the first user 208, such as first access code 222(1). The second user 212 may type the URL into the second user device 210 to enable the direct messaging communications. For another example, the invitation to direct message 226 may include a QR code, such as second access code 222(2). The second user may scan the second access code 222(2) utilizing the camera of the second user device 210 to enable the direct messaging communications with the first user.

In some examples, the access code(s) 222 may include a single use code. In such an example, responsive receiving an indication that the second user has activated the access code 222 (e.g., scanning, accessing a URL, establishing the direct messaging instance, etc.), the access code(s) 222 may be deactivated (e.g., disabled for future use). In some examples, the access code(s) 222 may include a multi-use code. In such examples, the first user 208 may provide the access code(s) 222 to multiple different second users 212 to establish a direct messaging instance with each of the second users 212. For example, the first user 208 may print the second access code 222(2) on a plurality of business cards. The first user 208 may hand out the plurality of business cards to a plurality of second users 212, such as to establish individual direct messaging instances with each of the plurality of second users 212.

In various examples, the communication platform 204 may be configured to provide an access code, such as access code(s) 222, directly to the second user device associated with the second user 212. At operation 228, the communication platform 204 may send the access code to the second user device 210. In some examples, the access code may be sent directly to the second user device 210 based on an instruction and/or information provided in the request for the access code described at operation 216. For example, a request for an access code from a first user 208 may include an instruction to provide the access code to a second user whom the first user 208 would like to invite to communicate via a direct messaging instance. The request may include a name and email address associated with the second user 212. The communication platform 204 may generate the access code responsive to the request and may send the access code to the second user device 210 based on the instruction.

At operation 230, the communication platform 204 may receive a request to enable direct messaging communications with the first user 208. In some examples, the request may include an activation of the access code. The activation may include scanning a code, clicking on a URL, accessing a website associated with the URL, or the like. The request may be sent responsive to receiving the access code from the first user 208 and/or directly from the communication platform 204. For example, the request may include the activation of the access code 222(2) on the invitation to direct message 226 provided by the first user 208. For another example, the request may include the activation of an access code, such as URL, sent via email from the communication platform.

In various examples, the request may include data associated with the access code. For example, responsive to scanning the access code, activating a link (URL), or the like, the second user device 210 may send the data associated with the access code to the communication platform 204. The communication platform 204 may receive the data and identify the access code as that associated with the first user 208. In various examples the data may include a token that is associated with the first user 208. In some examples, the communication platform 204 may identify the first user 208 associated with the access code based on the token. In various examples, the communication platform 204 may receive the token and may cause a message to be presented on a display associated with the second user device 210. The message may include a confirmation (e.g., acceptance) of the direct messaging instance with the first user 208.

In single use access code examples, responsive to receiving the request, the communication platform may associate the first user 208 and the second user 212 with the access code. In multi-use examples, the communication platform may associate the first user 208 and the second user 212 with a first instance of the access code. In such examples, the communication platform may be configured to process a plurality of instances of the access code to generate a plurality of direct messaging instances associated with the first user 208.

In some examples, the communication platform 204 may determine whether the access code is valid or has been revoked. Based on a determination that the access code is either invalid or has been revoked, the communication platform 204 may cause a notification of invalidity or revocation to be presented on the display of the second user device. For example, the first user 208 may request an access code and may request the communication platform 204 provide the access code to the second user 212. However, prior to activation of the access code by the second user 212, the first user 208 may revoke the access code (revoke the invitation to direct message). Later, when the second user 212 requests to enable the direct message communication with the first user, such as by clicking a link provided by the communication platform 204, the communication platform 204 may cause a notification of revocation to surface via the second user device 210.

In various examples, responsive to receiving the request to enable the direct messaging communications with the first user 208, the communication platform 204 may determine whether the second user 212 is associated with the communication platform 204. In such examples, the communication platform 204 may determine whether the second user 212 has an established account and/or whether the second user device 210 includes the second instance of the communication application 202(2).

Based on a determination that the second user 212 is not associated with the communication platform 204, the communication platform 204 may request additional information, such as user data associated with the second user 212. In some examples, the additional information may include a minimum amount of information requested by the communication platform 204 to establish a direct messaging instance with the second user 212. In some examples, the minimum amount of information may be based on organization data, such as an organizational preference, rule, etc., associated with a first organization of the first user 208. Responsive to receiving the additional information, the communication platform 204 may associate the second user 212 with the communication platform 204.

In some examples, the additional information may include an acceptance of terms and conditions associated with communicating via the communication platform 204. In some examples, the additional information may include an affirmative agreement to establish a direct messaging instance with the first user 208.

In some examples, the communication platform 204 may send an instruction to the second user device 210 to cause the second user 212 to download the second instance of the communication application 202(2). In some examples, the second instance of the communication application 202(2) may include a user interface via which the second user may send and receive messages in a one-on-one conversation with the first user 208. Various example interfaces associated with the second user accessing the communication platform and/or direct messaging instance are illustrated in at least FIGS. 4A-7D and described below.

Based on a determination that the second user 212 is associated with the communication platform 204, the communication platform 204 may determine whether an account type associated with the second user 212 enables direct messaging communications associated with the access code. In some examples, the account type may be determined based on second user data associated with the second user 212, such as that stored in a user profile. For example, free subscriptions to the communication platform 204 may be ineligible for direct messaging communications established using an access code.

In various examples, responsive to determining that an account type associated with the second user does not support expedited direct messaging communications, the communication platform 204 may cause a notification to be presented on a display of the second user device 210. The notification may include an indication that the second user 212 is ineligible to redeem the access code for expedited direct messaging communications. For example, based on a determination that the second user 212 is associated with a free subscription account, the communication platform 204 may determine that the second user 212 is ineligible for direct messaging with the first user 208. The communication platform 204 may surface a notification on the second user device 210 indicating that the second user 212 is ineligible to redeem the access code for expedited direct messaging communications.

In some examples, the communication platform 204 may determine whether an organization associated with the second user 212 enables direct messaging communications associated with the access code. In some examples, responsive to determining that the second user 212 is associated with the communication platform 204, the communication platform 204 may access organization data associated with the second user 212. The organization data may include an indication of whether the organization associated with the second user 212 supports (allows) expedited direct messaging communications. In some examples, the indication may be included in an organizational preference associated with the organization. In such example, an administrator associated with the organization may set the organizational preferences based on a desired level of privacy, security, centralized control, or the like.

In various examples, the organizational preferences may include restrictions associated with the expedited direct messaging communications. In some examples, the restrictions may include an amount and/or type of data authorized to be transmitted via a direct messaging instance generated based on an access code. For example, an organization associated with the first user 208 may authorize direct messaging instances generated based on an access code but may not permit transferring files (e.g., attachments) via the direct messaging instance. Thus, a first user 208 may request the access code and provide it to a second user 212, but the parties to the direct messaging communication may be restricted from sending attachments via the direct messaging instance.

In various examples, based on the request to enable the direct message communication, the additional information, and/or a determination that an account type and/or organizational preference associated with the second user 212 supports the expedited direct messaging communications, the communication platform 204 may generate the direct messaging instance between the first user 208 and the second user 212. The direct messaging instance may enable a one-to-one conversation between the first user 208 and the second user 212. In various examples, the amount and/or type of data authorized to be transmitted via the direct messaging instance may be based on the organizational preferences associated with the first user 208 and/or the second user 212.

At operation 232, the communication platform 204 may grant access to the direct messaging instance for the second user 212 to send and receive messages in a one-on-one conversation with the first user 208. In some examples, the second user 212 may send and receive the messages via the second instance of the communication application 202(2). At operation 234, the first user 208 may send and receive messages via the direct messaging instance. The first user 208 may send and receive the messages via the first instance of the communication application 202(1).

In some examples, the direct messaging instance may enable communications between the first user 208 and the second user 212 indefinitely or until one of the first user 208 or the second user 212 opts out of the direct messaging instance with the other user. In some examples, the direct messaging instance generated based on an access code may include a limited time period of use (e.g., 7 days, 14 days, etc.). In such examples, the direct messaging instance may be disabled after the time period elapses.

In various examples, the direct messaging instance generated based on an access code may be associated with a particular project. In some examples, the first user 208 may provide information about the particular project to the communication platform 204 when requesting an access code. In such examples, the communication platform 204 may associate the access code (and an associated direct messaging instance) with the particular project. In various examples, the direct messaging instance may be disabled at the termination of the particular project. In such examples, the communication platform 204 may be configured to determine project termination and/or may receive an indication thereof from the first user 208.

In various examples, the first user 208 and/or the second user 212 may provide an indication of project completion to the communication platform 204. In such examples, responsive to receiving the indication of project completion, the communication platform 204 may disable the direct messaging instance. Responsive to disabling the direct messaging instance, the communication platform 204 may restrict additional messages and/or data from being added to the conversation. As such, the first user 208 and the second user 212 may be restricted from sending or receiving additional messages via the direct messaging instance.

In various examples, the communication platform 204 may store messages and/or data (e.g., transferred files, attachments, etc.) transmitted via the direct messaging instance. The communication platform 204 may store the messages and/or data in a data shard associated with the first organization and/or a data shard associated with a second organization. In some examples, the communication platform 204 may store the messages and/or data in a data shard associated with the direct messaging instance.

In various examples, the first user 208 and/or the second user 212 may access the messages and/or data associated with the direct messaging instance, regardless of whether the direct messaging instance has been disabled. In examples in which the direct messaging instance has been disabled, the messages and/or data may be viewable but new messages and/or data may not be added thereto. For example, the first user 208 may access messages associated with a disabled direct messaging instance via the first instance of the communication application 202(1), such as to refer back to a previous conversation with another user.

Figure 3:
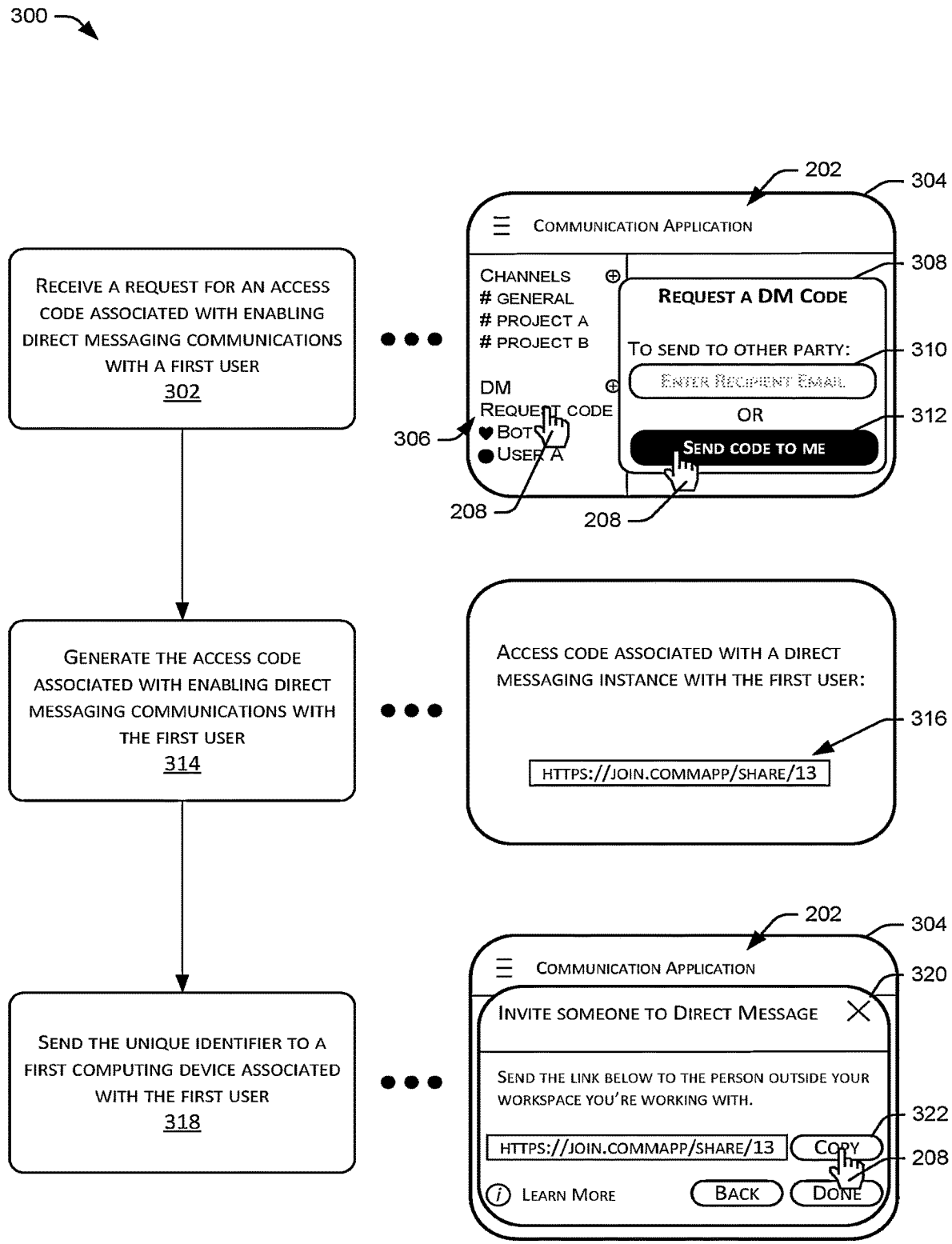
FIG. 3 illustrates an example process for providing an access code associated with a direct messaging instance with a first user.

FIG. 3 illustrates an example process 300 for providing an access code associated with a direct messaging instance with a first user 208. The process 300 may be performed by one or more computing devices associated with a communication platform, such as communication platform 204.

At operation 302, communication platform receives a request for an access code associated with enabling direct messaging communications with a first user. In various examples, the request may be received via an instance of a communication application 202. In various examples, the communication application 202 may include a user interface 304 including a selectable control 306 associated with requesting an access code for direct messaging.

In various examples, responsive to the first user 208 selecting the selectable control 306, the communication platform may cause a window 308 to surface on the user interface 304. In some examples, the window 308 may include a request for additional information associated with the access code. In the illustrative example, the window 308 includes a first option 310 for the user 108 to include an email address associated with a recipient of the access code and a second option 312 for the first user 208 to receive the access code. In other examples, the window 308 may include additional or alternative options, such as an input for a name, organization, or other information associated with a second user.

In various examples, responsive to the first user 208 selecting the first option (inputting the recipient email), the communication platform may generate the access code and send an invitation including the access code directly to a second user, such as that described at operation 228 of FIG. 2.

In the illustrative example, the first user 208 selects the second option 312. At operation 314, based at least in part on receiving an indication of selection of the second option 312, the communication platform may generate an access code 316. In the illustrative example of FIG. 3, the access code 316 includes a link (URL) associated with an invitation to direct message with the first user. In other examples, the access code may include a QR code or other type of discrete code that identifies at least the first user and/or the first user profile for establishing a new direct messaging instance.

At operation 318, the communication platform may send the access code 316 to a first computing device associated with the first user 208, such as first user device 206. In various examples, the communication platform may cause a second window 320 to surface as via the user interface 304 associated with the communication application 202. In various examples, the communication platform may cause the access code 316 to be stored in a user profile associated with the first user 208, accessible via the user interface 304. In various examples, one or more access codes 316 may be stored and/or accessible via the user interface 304. In such examples, the first user 208 may share the codes with others with whom the first user 208 desires to communicate quickly and efficiently.

In various examples, the second window 320 may include a selectable control 322 to copy the access code 316. In such examples, the first user 208 may be able to copy and paste the access code 316, such as into another document or application. The first user 208 may then be provide the access code 316 to a second user, such as to quickly establish communications therewith. For example, the first user 208 may copy the access code 316 and paste the code into a business card template. The first user 208 may then be able to quickly and efficiently enable private, secure communications via the communication platform with select people by sharing the business card, either in person or electronically, such as attached to an email. For another example, the first user 208 may copy and paste the access code 316 into an email signature. The first user 208 may thus be able to quickly and efficiently enable private, secure communications via the communication platform with select people via email.

By utilizing the techniques described herein, the first user 208 may establish the private, secure one-on-one communications via the communication platform in a quicker more efficient manner than traditional systems permit. Thus, the techniques described herein improve existing communication systems. Additionally, the communication platform stores data associated with each direct messaging instance, whether enabled or disabled. Thus, the communication platform may provide a single source via which the first user 208 may quickly and easily access stored data associated with communications with a plurality of different people. Accordingly, the techniques described herein may improve existing communication systems by providing the single storage source for data associated with a plurality of conversations.

Example User Interfaces

FIG. 4A-FIG. 7D are schematic views showing example user interfaces that are usable to implement the techniques described herein for generating direct messaging instances. The interfaces may be generated by a computing device of a communication platform (e.g., communication platform server(s) 102, communication platform 204, etc.) and transmitted to one or more user computing devices (e.g., first computing device(s) 104, first user device(s) 206, second computing device(s) 106, and/or second user device(s) 210) for presentation. Additionally or alternatively, the interfaces may be generated by the user computing device(s) based at least in part on instructions received from the communication platform. As discussed above, the interfaces described in this section may, but need not, be implemented in the context of the systems 100 or 200.

FIGS. 4A-4C illustrate example interfaces corresponding to a user 402 (e.g., second user 402, such as second user 212) associated with a communication platform accepting an invitation 404 to communicate via a direct messaging instance. Interface 400A shown in FIG. 4A illustrates scanning an access code 406 associated with the invitation 404 using a camera 408 of a user computing device 410. In the illustrative example, the access code 406, such as second access code 222(2) of FIG. 2, includes a QR code. In other examples, the access code 406 may include any other type of code generated by a communication platform for enabling expedited direct messaging communications, such as a URL, a bar code, or the like.

As described above, the communication platform may generate the access code 406 responsive to a request from a first user 412, such as first user 208, associated with a first organization 414, such as via an instance of a communication application managed by the communication platform. In some examples, the communication platform may provide the access code 406 directly to another user, such as the second user 402. In various examples, the communication platform may provide the access code 406 to the first user 412. In such examples, the first user 412 may share the access code with select individuals with whom the first user 412 invites to communicate via a direct messaging instance, such as the second user 402.

In some examples, the access code 406 may include a single use code. In such examples, the access code 406 may be used one time to generate a direct messaging instance between the first user 412 and a second user, such as the second user 402. In some examples, the access code 406 may include a multi-use code. In such examples, the access code 406 may be used one or more times to generate one or more direct messaging instances between the first user 412 and other users, such as the second user 402.

In various examples, the first user 412 may provide the second user 402 with the access code 406 electronically, such as via an email, social networking message, or the like. In the illustrative example, the first user 412 provides the access code 406 to the user via a business card 416. For example, the first user 412, Tony, may receive the access code 406 from the communication platform responsive to a request therefore and may print the access code on the business card 416. Tony may then provide a business card with the invitation 404 to the second user 402, Frank.

As illustrated in FIG. 4A, the second user 402 may utilize the camera 408 to scan the access code 406. Responsive to determining that the access code 406 is associated with the communication platform, the user computing device 410 may surface a window 418 including an option to launch a communication application and/or open the invitation 404 in the communication application.

In various examples, responsive to receiving a selection of a cancel option 420 associated with the window 418, the user computing device 410 may not open the communication application. In such examples, the user computing device 410 may return to a previous application associated with user use of the computing device 410 and/or continue to present data captured by the camera 408.

In various examples, responsive to receiving a selection of an open option 422 associated with the window 418, the user computing device 410 may open or otherwise launch a communication application 424, such as that illustrated in interface 400B shown in FIG. 4B. In various examples, the communication platform may process a token associated with the access code 406 to determine the first user 412 associated therewith.

In various examples, the communication platform may cause a window 426 to surface on the interface 400B associated with the communication application 424. In some examples, the window 426 may include a confirmation that the second user 402 intends to associate with a direct messaging instance with the first user 412. The window 426 may include information associated with the invitation 404. In the illustrative example, the window 426 may include a message 428 indicating that the first user 412 from the first organization 414 would like to directly message with the second user 402 as well as picture 430 associated with the first user 412. In various examples, the picture 430 may assist the second user 402 in identifying the first user 412. In some examples, the picture 430 may include an avatar or other representation of the first user 412. While the illustrative example includes the message 428 and the picture 430, this is merely an example and the window may include additional or alternative information.

In various examples, the window 426 may include a continue option 432. In some examples, responsive to receiving an indication that the second user 402 selected the continue option 432, the communication platform may cause the communication application 424 to surface a second window 434 on the interface 400B. The second window 434 may enable the second user 402 to select a workspace with which to associate the direct messaging instance with the first user 412.

In various examples, responsive to receiving an indication of selection of a workspace, the communication platform may cause the communication platform to surface a third window 436. In some examples, the communication application 424 may surface the third window 436 responsive to receiving the indication that the second user 402 selected the continue option 432. In such examples, the user may include a single workspace with which to associate the direct messaging instance and/or a user profile associated with the user may include a default workspace with which to associate direct messaging instances associated with access codes 406.

In the illustrative example, the third window 436 includes a review of the details associated with the direct messaging instance to be generated by the communication platform. In various examples, the third window 436 may include a closing option 438, via which the second user 402 may close out the third window and cancel a pending acceptance of the invitation 404. In such examples, responsive to receiving an indication of selection of the closing option 438, the communication platform would not generate the direct messaging instance. In various examples, the access code 406 may remain active indefinitely or until revoked by the first user 412. In some examples, the access code 406 may include an associated activation time period (e.g., 7 days, 10 days, 14 days, etc.). In such examples, the access code 406 may remain active and selectable for generating a direct messaging instance for the activation time period. For example, an access code 406 may include an activation time period of 7 days. Thus, Frank may select the closing option 438 at a first time after scanning the access code 406 and opening the communication application 424. Later, at a second time, Frank may re-scan the access code 406, open the communication application 424, and accept the invitation, such as via an acceptance option 440.

As illustrated, the third window 436 may include a final acceptance of the invitation, such as via the acceptance option 440. In various examples, the acceptance option 440 may include an approval by the second user 402 to enter into the direct messaging instance with the first user 412. In various examples, the third window 436 may include a hyperlink associated with terms and conditions for communicating via the direct messaging instance. In such examples, the acceptance option 440 may represent an acceptance of the terms and conditions for communicating via the direct messaging instance.

Based at least in part on receiving an indication of selection of the acceptance option 440, the communication platform may cause the communication application 424 to surface the interface 400C shown in FIG. 4C. The interface 400c illustrates a messaging interface between the second user 402 and the first user 412. In the illustrative example, the interface 400c includes a first indication 442 of the other party associated with the direct messaging instance (e.g., first user 412) and a second indication 444 that the first user 412 is associated with an organization that is different than an organization associated with the second user 402. In the illustrative example, the second indication 444 includes a square. However, this is merely an example, and the second indication 444 may include any other shape or symbol, color indicator, or combination used to represent a different organization for the second user 402.

Additionally or alternatively, the interface 400c may include a warning 446 to indicate that the other party associated with the direct messaging instance is associated with a different organization from an organization of the second user 402.

In various examples, the interface 400c may include a drafting window 448. The drafting window 448 may provide a means by which the second user 402 may draft messages to the first user 412. For example, Frank may initiate a conversation with Tony by drafting a first message 450. Responsive to sending the first message 450, the communication application 424 may present the first message 450 in a messaging window 452. The messaging window 452 may include a display of the messages associated with the direct messaging instance between Frank and Tony.

FIGS. 5A-5C illustrate example interfaces corresponding to a user 502 (e.g., second user 502, such as second user 212) associating with a communication platform and accepting an invitation 504 to communicate via a direct messaging instance associated with the communication platform. Interface 500A shown in FIG. 5A illustrates the second user 502 scanning an access code 506 associated with the invitation 504 using a camera 508 of a user computing device 510. In the illustrative example, the access code 506, such as second access code 222(2) of FIG. 2, includes a QR code. In other examples, the access code 506 may include any other type of code generated by a communication platform for enabling expedited direct messaging communications, such as a URL, a bar code, or the like.

As described above, the communication platform may generate the access code 506 responsive to a request from a first user 512, such as first user 208, associated with a first organization 514, such as via an instance of a communication application managed by the communication platform. In some examples, the communication platform may provide the access code 506 directly to another user, such as the second user 502. In various examples, the communication platform may provide the access code 506 to the first user 512. In such examples, the first user 512 may share the access code with select individuals with whom the first user 512 invites to communicate via a direct messaging instance, such as the second user 502.

In some examples, the access code 506 may include a single use code. In such examples, the access code 506 may be used one time to generate a direct messaging instance between the first user 512 and a second user, such as the second user 502. In some examples, the access code 506 may include a multi-use code. In such examples, the access code 506 may be used one or more times to generate one or more direct messaging instances between the first user 512 and other users, such as the second user 502. For example, the first user 512, Tony, may print a plurality of business cards 516 including the multi-use access code 506. Each of the access codes 506 on the business cards 516 may be redeemed by a different user to establish a direct messaging instance with Tony. For another example, Tony may print a single business card 516 including the single-use access code 506. The single use access code 506 may be redeemed by a single person, such as the second user 502, Frank, to establish a direct messaging instance with Tony.

As illustrated in FIG. 5A, the second user 502 may utilize the camera 508 to scan the access code 506. In some examples, the user computing device 510 may process the access code 506 and determine that the access code 506 is associated with the communication platform and/or a communication application that is not installed on the user computing device 510. Based on a determination that the communication application is not installed, the user computing device 510 may surface a window 518 informing the second user 502 that the code is associated with the communication application. In some examples, the window 518 may include an inquiry as to whether the second user would like to download the application for enabling direct messaging communications.

In various examples, responsive to receiving a selection of a cancel option 520 associated with the window 518, the user computing device 510 may download the communication application. In such examples, the user computing device 510 may return to a previous application associated with second user 502 use of the computing device 510 and/or continue to present data captured by the camera 508.

In various examples, responsive to receiving a selection of a download option 522 associated with the window 518, the user computing device 510 may download the communication application. In some examples, responsive to receiving the selection of the download option 522, the user computing device 510 may launch an application store or other means by which the second user 502 may download the communication application. In some examples, responsive to downloading the communication application, the user computing device 510 may launch the communication application.

Interface 500B shown in FIG. 5B illustrates a user interface associated with a first launch of the communication application 524 on the user computing device 510. In various examples, the first launch may include a welcome page 526 introducing the communication application 524. In some examples, the first launch may include a sign-in window 528. In the illustrative example, the sign-in window 528 may include a quick sign-in option. The quick sign-in option may include an input box 530 via which the second user 502 may input user data to establish an account with the communication platform. In the illustrative example, the user data includes an email address associated with the second user 502. However, this is merely used as an illustrative example and additional and/or alternative information may be requested via one or more input boxes 530.

In various examples, the account established via the quick sign-in may include a trial account for the second user 502 to experience communicating via the communication platform. In some examples, the trial account may include a temporary account. In such examples, the account may be valid for a pre-determined time period. In some examples, the pre-determined time period may include a duration of the direct messaging instance. For example, a direct messaging instance may include a time period of 14 days. After the time period has elapsed, the direct messaging instance may be disabled as well as the temporary account associated with the second user 502.

In some examples, communication application may provide a means by which the second user 502 may be able to upgrade the trial account to a regular (e.g. non-trial) account with the communication platform. In such examples, the communication platform may request additional user data from the second user 502 to establish the regular account.

In various examples, responsive to receiving an input via the input box 530 and/or established the account with the second user 502, the communication platform may process a token associated with the access code 506 to determine the first user 512 associated therewith.

In various examples, the communication platform may cause a window 532 to surface on the interface 500c (shown in FIG. 5C) associated with the communication application 524. In some examples, the window 532 may include a confirmation that the second user 502 intends to communicate with first user 512 using a direct messaging instance. The window 532 may include information associated with the invitation 504. In the illustrative example, the window 532 may include a message 534 indicating that the first user 512 from the first organization 514 would like to directly message with the second user 502 as well as picture 536 associated with the first user 512. In various examples, the picture 536 may assist the second user 502 in identifying the first user 512. In some examples, the picture 536 may include an avatar or other representation of the first user 512. While the illustrative example includes the message 534 and the picture 536, this is merely an example and the window may include additional or alternative information.

In various examples, the window 532 may include a continue option 538. In some examples, the continue option 538 may include a final acceptance of the invitation. In such examples, the continue option 538 may provide an indication that the second user 502 approves of entering into the direct messaging instance with the first user 512.

Based at least in part on receiving an indication of selection of the continue option 538, the communication platform may cause the communication application 524 to surface the messaging interface 540 between the second user 502 and the first user 512. In the illustrative example, the messaging interface 540 includes a first indication 542 of the other party associated with the direct messaging instance (e.g., first user 512) and a second indication 544 that the first user 512 is associated with an organization that is different than an organization associated with the second user 502. In the illustrative example, the second indication 544 includes a square. However, this is merely an example, and the second indication 544 may include any other shape or symbol used to represent a different organization from the second user 502.

Additionally or alternatively, the messaging interface 540 may include a warning 546 to indicate that the other party associated with the direct messaging instance is associated with a different organization from an organization of the second user 502.

In various examples, the messaging interface 540 may include a drafting window 548. The drafting window 548 may provide a means by which the second user 502 may draft messages to the first user 512. For example, Frank may initiate a conversation with Tony by drafting a first message 550. Responsive to sending the first message 550, the communication application 524 may present the first message 550 in a messaging window 552. The messaging window 552 may include a display of the messages associated with the direct messaging instance between Frank and Tony.

Figure 6A:
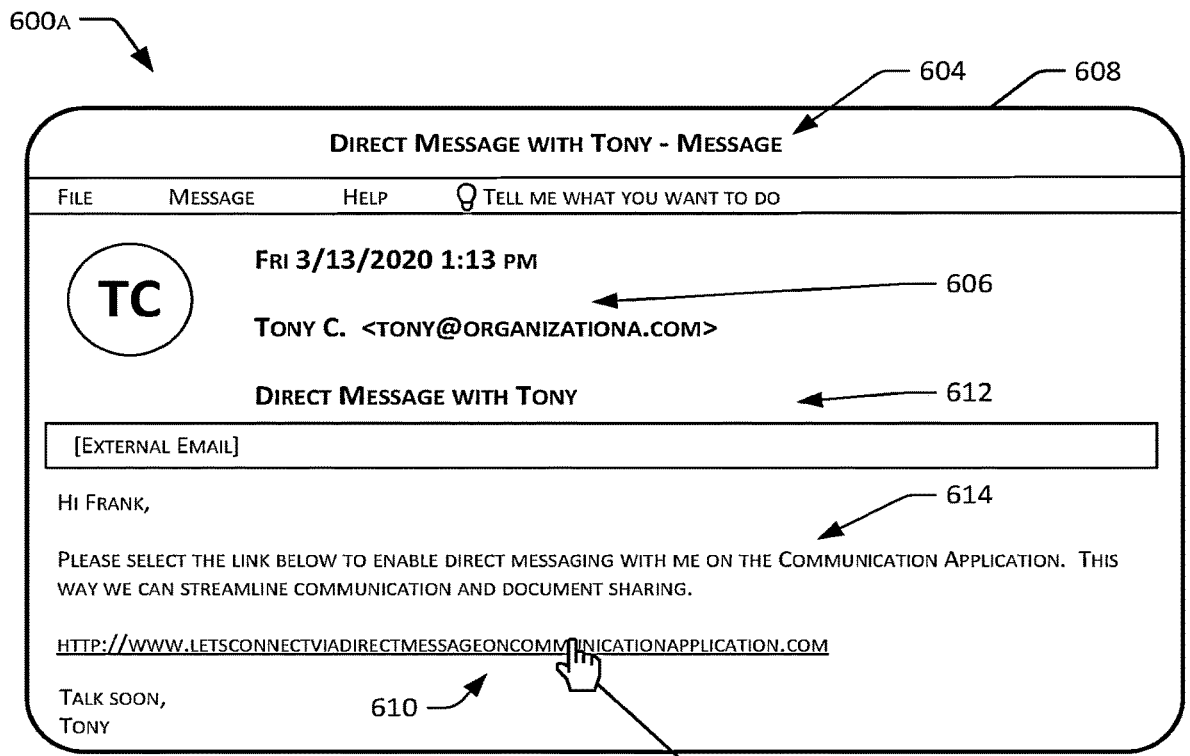
FIGS. 6A-6C illustrate example interfaces corresponding to a user accepting an invitation from another user to communicate via a direct messaging instance.
Figure 6B:
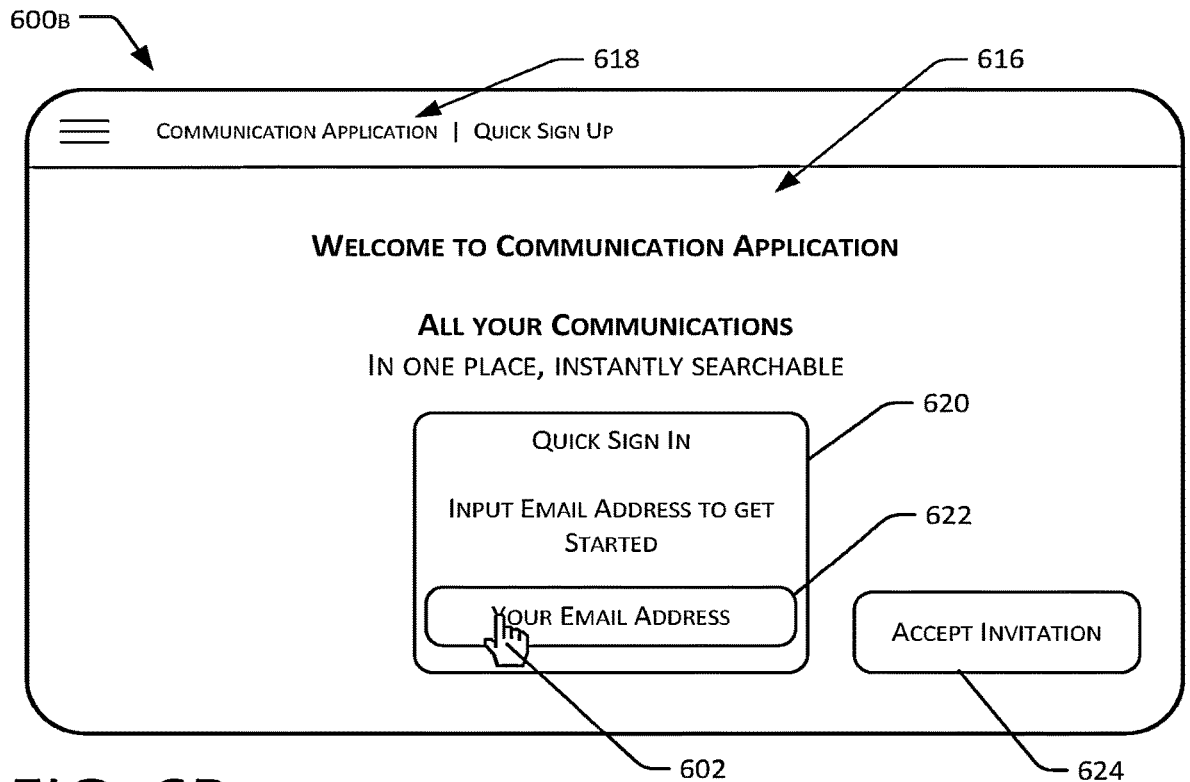
Figure 6C:
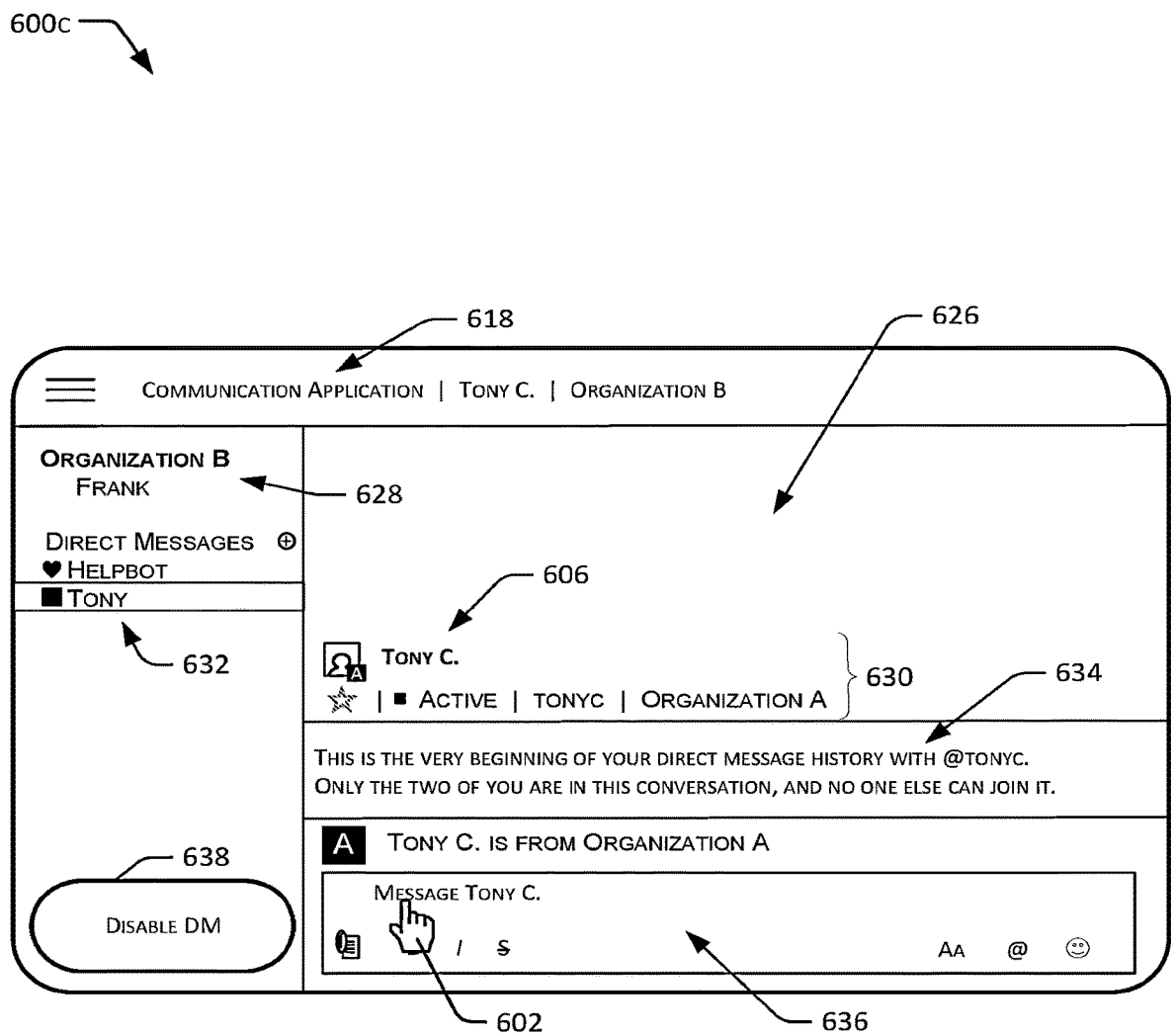

FIGS. 6A-6C illustrate example interfaces corresponding to a user 602 (e.g., second user 602, such as second user 212) accepting an invitation 604 from a first user 606, such as first user 208, to communicate via a direct messaging instance. Interface 600A shown in FIG. 6A illustrates an invitation 604 to communicate with the first user 606 via the communication platform, viewable via an electronic mail application (e.g., mobile application, web application, etc.). The invitation 604 may be accessed by the second user 602 via a mobile or desktop user computing device, such as the second computing device(s) 106 and/or the second user computing device(s) 210. In the illustrative example, the invitation 604 includes an email message 608 with an access code 610. In other examples, the invitation 604 may be provided via social networking message, text message, on paper, or by any other means by which the first user 606 may communicate the access code 610 to the second user 602.

In the illustrative example, the access code 610 comprises a URL corresponding to a website associated with the communication platform. As discussed above, the communication platform may generate the URL responsive to receiving a request for an access code 610 from the first user 606. In some examples, the request may include a request for the communication platform to send the access code to the second user 602, directly. In the illustrative example, the first user 606 received the access code 610 from the communication platform and provides the access code to the second user 602. In such an example, the first user 606 may include a subject line 612 and/or message 614 informing the second user 602 about the access code 610. The subject line 612 and/or message 614 may provide a means by which the first user may include a personal touch, such as to encourage the second user 602 to accept the invitation 604.

In various examples, responsive receiving an indication that the second user 602 has activated or selected the access code 610, the communication platform may process a token associated with the access code 610. The token may include an indication that the access code 610 is associated with the first user 606. In various examples, the communication platform may additionally determine an identity associated with the second user 602. In some examples, the communication platform may determine whether the second user 602 is associated with (e.g., has an account with) the communication platform. In some examples, the communication platform may determine whether the second user 602 is associated with the communication platform based on an Internet Protocol address associated with the activation or selection of the access code 610, user identifier, device identifier, and/or other information that may be digitally transmitted to the communication platform.

Based on a determination that the second user 602 is not associated with the communication platform (e.g., transmitted information does not link to an existing account), the communication platform may cause a welcome page 616 to launch on the user computing device, such as that illustrated in interface 600B of FIG. 6B. In various examples, the welcome page 616 may be associated with a first launch of a communication application 618 (web application) on the user computing device. In some examples, the welcome page 616 may include a sign-in window 620. In the illustrative example, the sign-in window 620 may include a quick sign-in option. The quick sign-in option may include an input box 622 via which the second user 602 may input user data to establish an account with the communication platform. In the illustrative example, the user data includes an email address associated with the second user 602. However, this is merely an illustrative example and additional and/or alternative information may be requested via one or more input boxes 622.

In various examples, an account established via the quick sign-in option may include a trial account for the second user 602 to experience communicating via the communication platform. In some examples, the trial account may include a temporary account. In such examples, the account may be valid for a pre-determined time period. In some examples, the pre-determined time period may include a duration of the direct messaging instance. For example, a direct messaging instance may include a time period of 30 days. After the time period has elapsed, the direct messaging instance may be disabled as well as the temporary account associated with the second user 602.

In some examples, communication application 618 may provide a means by which the second user 602 may be able to upgrade the trial account to a regular (e.g. non-trial) account with the communication platform. In such examples, the communication platform may request additional user data from the second user 602 to establish the regular account.

In various examples, the second user 602 may request to enable the direct message communications with the first user 606 by inputting the requested information (e.g., email address) into the input box 622 and selecting the accept invitation option 624. Responsive to receiving an indication that the second user 602 has selected the accept invitation option 624, the communication platform may process the information sent via the request, such as the email address and/or other information input into the sign-in window 620 and/or input box 622. In various examples, the communication platform may generate the account associated with the second user 602 based on the information sent via the request to enable direct messaging communications.

In various examples, the communication platform may receive the request to enable the direct message communications with the first user 606 and may generate a direct messaging instance between the first user 606 and the second user 602. In some examples, the communication platform may send a user interface to a first computing device associated with the first user 606 and/or a second computing device associated with the second user 602. In some examples, the communication platform may send an instruction to the communication application 618 associated with the first computing device and/or the second computing device to display the direct messaging instance.

Interface 600c of FIG. 6C illustrates the communication application 618 displaying the direct messaging instance 626. The direct messaging instance 626 may facilitate one-on-one conversations between the first user 606 and the second user 602 via the communication platform. In the illustrative example, the communication application 618 may display account information 628 associated with the interface 600c. The account information 628 may provide information about the presented account and/or direct messaging instance 626, such as an identification of the second user 602 and/or an organization associated therewith. For example, the second user 602, Frank, is associated with Organization B. Frank accepts an invitation from the first user 606, Tony, to enter into the direct messaging instance 626. The communication application 618 presents the account information 628 on the interface 600c to indicate that the account and/or direct messaging instance 626 is associated with Frank from Organization B.

In various examples, the direct messaging instance 626 includes first user information 630 associated with the first user 606, with whom the second user 602 may communicate. The first user information 630 may provide a means by which the second user 602 may quickly and easily identify the first user 606 and/or information about the first user 606. In the illustrative example, the first user information 630 includes an identity of the first user 606, an indication of whether the first user 606 is identified as a preferred person with whom to communicate (e.g., selectable star to indicate preferred status), an indication of whether the first user 606 is active or away (e.g., instance of the communication application associated with the first user 606 is not in use), a user name (e.g., handle) associated with the first user 606, and an organization associated with the first user. Though this is merely an illustration and additional and/or alternative information may be included in the first user information 630.

In various examples, the interface 600c may include a list of direct messaging instance 632. In some examples, the list of direct messaging instances 632 may include a selectable list, via which the second user 602 may transition from the direct messaging instance 626 to another direct messaging instance. In the illustrative examples presented in FIGS. 6A-6C, the communication platform generated the account for the second user 602 based on an invitation to direct message with the first user 606. As such, the list of direct messaging instances 632 includes an indication of the direct message with the first user 606, Tony, and direct message associated with a helpbot via which the second user 602 may ask questions about communication application 618 functionality, receive information about changes to the communication application 618, and the like. Additional messaging instances may be added to the list of direct messaging instances 632 as the second user 602 becomes associated therewith.

In various examples, the direct messaging instance 626 may provide an indication of a start of a conversation 634 between the first user 606 and the second user 602. In the illustrative example, the indication of the start of the conversation 634 includes information about the direct messaging instance 626, such as that only two people, the first user 606 and the second user 602 are in the conversation and that no one else can view the contents. In other examples, the indication of the start of the conversation 634 may include other information, such as an additional warning that the first user 606 is associated with an organization that is different from an organization of the second user 602. In such an example, the additional warning may include an indication to be mindful of the documents and other information provided to the first user 606 via the direct messaging instance 626.

In various examples, the interface 600c may include a drafting window 636. The drafting window 636 may provide a means by which the second user 602 may draft messages to the first user 606. For example, Frank may initiate a conversation with Tony by drafting a first message. Responsive to sending the first message via the drafting window 636, the communication application 618 may present the first message in a messaging window below the start of the conversation indication 634. The messaging window may include a display of the messages associated with the direct messaging instance 626 between Frank and Tony, such as in chronological order.

In various examples, the interface 600c may include a selectable control 638 to disable (e.g., end) the direct messaging instance 626. In the illustrative example, the selectable control 638 is labeled "DISABLE DM," however, this is merely an example, and the selectable control 638 may include any other label indicative of disconnecting from or terminating the direct messaging instance. In some examples, responsive to receiving an indication that the second user 602 selects the selectable control 638, the communication platform may disable the direct messaging instance 626. In such examples, the communication platform may disable the interface 600c from receiving an input, such as via the drafting window 636.

In various examples, the communication platform may archive the direct messaging instance 626 in a datastore. In such examples, the messages associated with the direct messaging instance 626 may be visible to the first user 606 via an associated instance of the communication application and/or the second user 602 via the communication application 618.

Figure 7A:
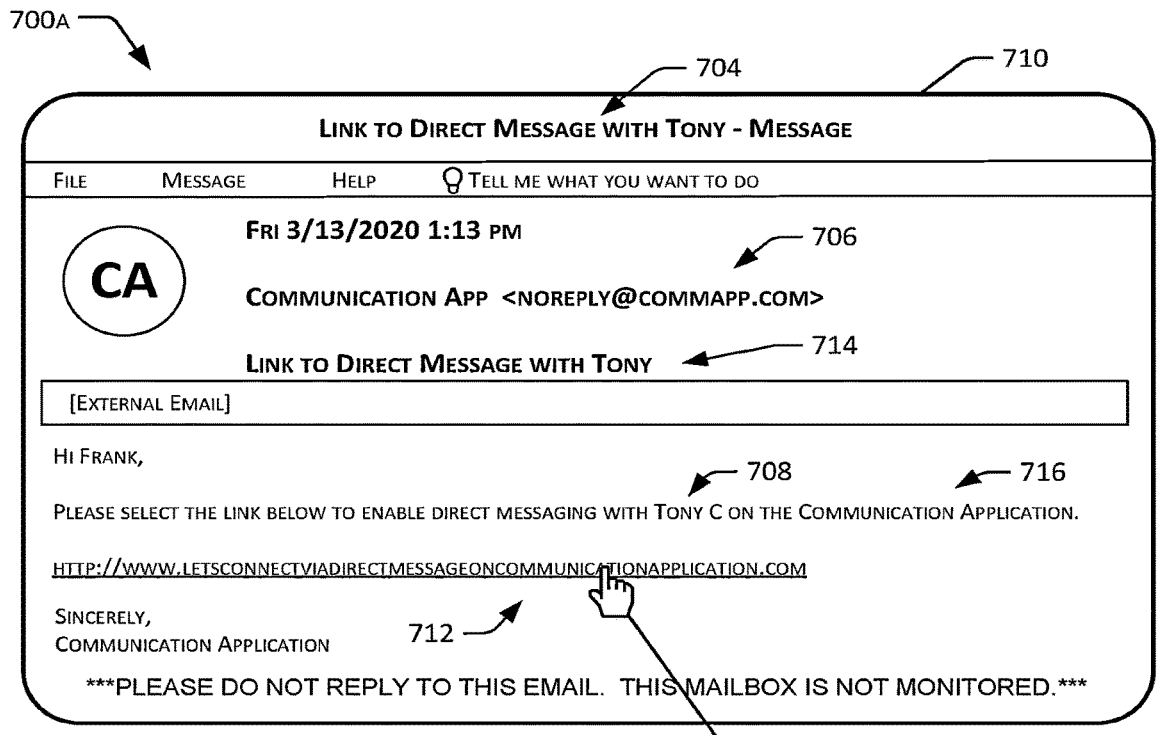
FIGS. 7A-7D illustrate example interfaces corresponding to a user accepting an invitation from a communication platform to communicate via a direct messaging instance with another user.

FIGS. 7A-7D illustrate example interfaces corresponding to a user 702 (second user 702, such as second user 212) accepting an invitation 704 from a communication platform 706 (labeled Communication App), to communicate via a direct messaging instance with a first user 708, such as first user 208. Interface 700A shown in FIG. 7A illustrates an invitation 704 to communicate with the first user 708 via the communication platform, viewable via an electronic mail application (e.g., mobile application, web application, etc.). The invitation 704 may be accessed by the second user 702 via a mobile application or a desktop application associated with mobile or desktop user computing device, such as the second computing device(s) 106 and/or the second user computing device(s) 210. In the illustrative example, the invitation 704 includes an email message 710 with an access code 712. In other examples, the invitation 704 may be provided via social networking message, text message, on paper, or by any other means by which the communication platform 706 may communicate the access code 712 to the second user 702.

The access code 712 may include any type of code usable to associate the first user 708 with a direct messaging instance, such as a QR code, micro QR code, bar code, URL, or the like. In some examples, the access code 712 may include a token usable to identify the first user 708 as the user associated with access code generation and/or with the resulting direct messaging instance. In the illustrative example, the access code 712 comprises a URL corresponding to a website associated with the communication platform 706. As discussed above, the communication platform 706 may generate the URL responsive to receiving a request for an access code 712 from the first user 708.

In some examples, the request may include a request for the communication platform 706 to send the access code to the second user 702, directly. In such examples, the first user 708 may provide user data associated with the second user, such as an email address, phone number, social networking handle, or other identifier associated with the second user 702. Based on the request and the user data, the communication platform 706 may generate and send the access code 712 to the second user 702. For example, the first user 708, Tony, may request that the communication platform 706 send an access code to the second user 702, Frank. Tony may send the communication platform 706 user data associated with Frank, such as Frank's email address. Responsive to receiving the request and the email address, the communication platform 706 may generate the access code 712 and send it to Frank via email.

In various examples, the communication platform 706 may be configured to generate a subject line 714 for the email message 710. The subject line 714 may provide a brief explanation of the contents of the email message 710. For example, the subject line 714 may include an explanation that the email message 710 includes a link to direct message with Tony. In some examples, the communication platform 706 may additionally be configured to generate a message 716 explaining the access code 712 and/or providing an instruction for the second user 702 to accept the invitation 704.

In various examples, responsive receiving an indication that the second user 702 has activated or selected the access code 712, the communication platform may process the token associated with the access code 712. As discussed above, the token may include an indication that the access code 712 is associated with the first user 708. In various examples, the communication platform 706 may additionally determine whether the second user 702 is associated with (e.g., has an account with) the communication platform 706. In some examples, the communication platform may determine whether the second user 702 is associated with the communication platform based on the user data provided by the first user 708, an Internet Protocol address associated with the activation or selection of the access code 712, a user identifier, a device identifier, and/or other information that may be digitally transmitted to the communication platform 706 upon selection or activation of the access code 712.

In various examples, the communication platform 706 may determine whether a user account associated with the second user 702 supports direct messaging communications generated via access code 712. Based on a determination that the user account does not support the direct messaging communications, the communication platform may surface a notification indicating that the direct messaging communications with the first user are not supported.

In various examples, the communication platform 706 may determine whether an organization associated with the second user 702 permits direct messaging communications generated via access code 712. In some examples, the communication platform 706 may access organizational preferences associated with the organization to determine whether direct messaging communications generated via the access code 712 are permitted. For example, an organization may have associated therewith organizational preferences that include strict security protocols. The strict security protocols may not permit communications with individuals outside of the organization without administrator approval.

Figure 7B:
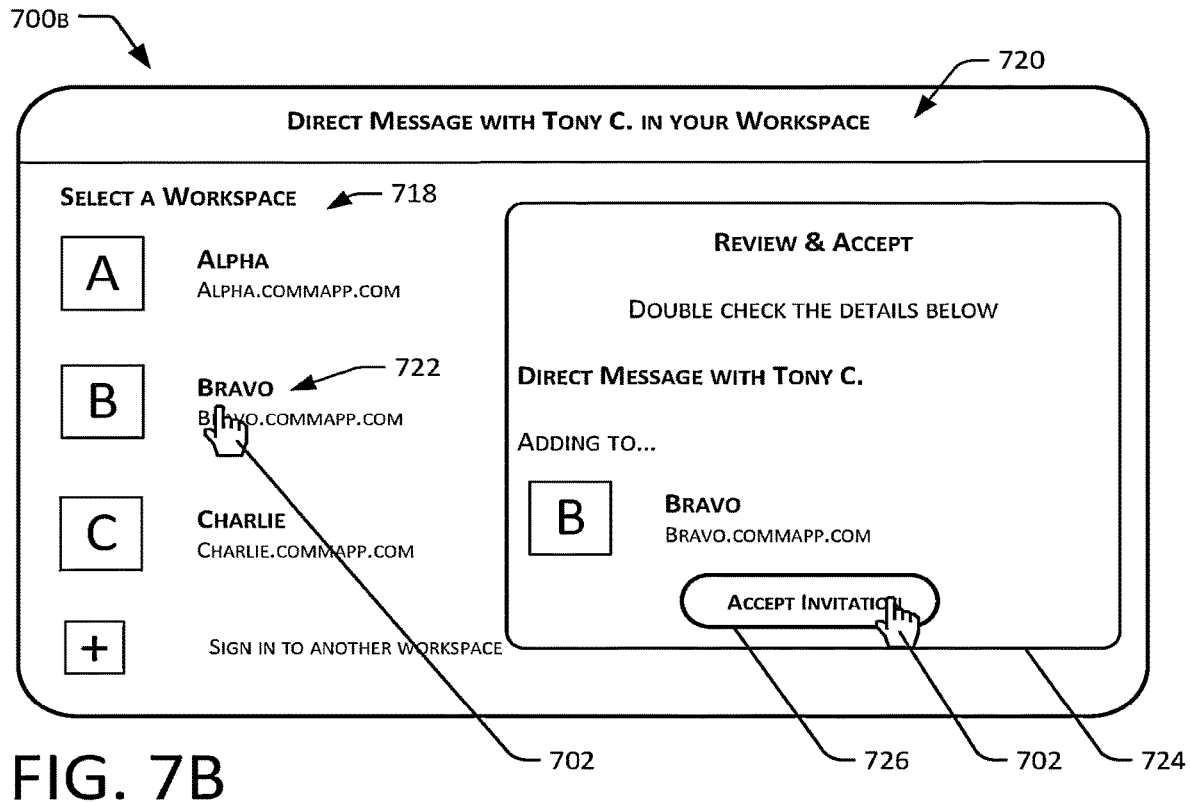

Based on a determination that the second user 702 is associated with the communication platform 706 and/or that a user account and/or organization associated with the second user 702 supports the direct messaging communications, the communication platform 706 may cause the interface 700B to surface on a user computing device associated with the second user 702. The interface 700B of FIG. 7B illustrates a workspace selection interface 718 associated with an instance of a communication application 720 corresponding to the second user 702. The workspace selection interface 718 may provide a means by which the second user 702 may select a workspace with which to associate a direct messaging instance with the first user 708.

In the illustrative example, the second user 702 selects the Bravo workspace 722. In various examples, the communication platform 706 may receive an indication of selection of the Bravo workspace 722 (or another workspace) via the workspace selection interface 718. Based on the indication of selection, the communication platform 706 may cause a review window 724 to surface via the interface 700B.

As illustrated in FIG. 7B, the review window 724 may include details of the workspace 722 to associate with the direct messaging instance and a name associated with the first user 708. In other examples, the review window 724 may include additional or alternative information, such as an organization associated with the first user 708 or other information to inform a decision to accept an invitation therefrom.

In various examples, the review window 724 may include an accept invitation selectable control 726. The accept invitation selectable control 726 may provide a means by which the second user 702 may quickly and easily request to enable the direct messaging instance with the first user 708.

Figure 7C:
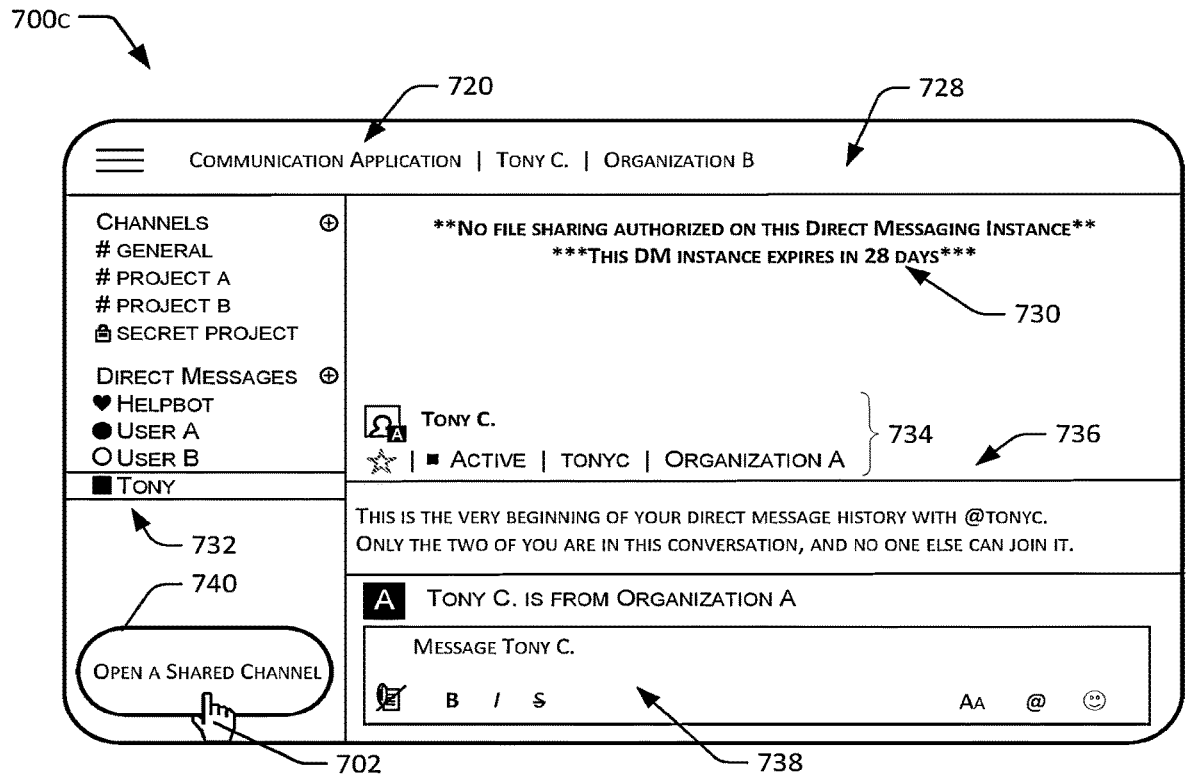

Based at least in part on receiving an indication of selection of the accept invitation selectable control 726, the communication platform 706 may generate the direct messaging instance between the first user 708 and the second user 702. Interface 700c of FIG. 7C illustrates the direct messaging instance 728 displayed via the instance of the communication application 720 associated with the second user 702.

In various examples, the communication platform 706 may send an instruction to the communication application 720 to present the direct messaging instance 728 via the interface 700c.

In various examples, the direct messaging instance 728 may include a notification of messaging limitations 730. The notification of messaging limitations 730 may include one or more limitations associated with the direct messaging instance 728. The limitations may include a restriction on data that may be transferred via the direct messaging instance 728 (e.g., files, a size associated with the files (e.g., no files over 10 megabytes, etc.), photographs, etc.), a number of messages that may be sent in a given time period (e.g., per hour, per day, per week, etc.), a time period associated with an expiration of the direct messaging instance 728 (e.g., countdown timer, days remaining until expiration, hours remaining, etc.), and the like.

In various examples, the communication platform may determine the limitations based on a user account associated with the second user 702 and/or organizational preferences associated with a first organization associated with the first user 708 and/or organizational preferences associated with a second organization associated with the second user 702. In such examples, the communication platform 706 may access user account information and/or the organizational preferences associated with the first organization and/or the second organization to determine the limitations (if any) on the direct messaging instance 728. For example, Organization B may not support file sharing via a direct messaging instance 728 generated based on an access code 712. Accordingly, the communication platform 706 may cause the notification of messaging limitations 730 to be presented via the direct messaging instance 728 to inform the second user 702 that files may not be shared via the direct messaging instance 728. For another example, the direct messaging instance 728 generated based on the access code 712 may include a finite time period of use, such as 30 days. The direct messaging instance 728 may thus be used to facilitate communication between the first user 708 and the second user 702 for the 30-day time period. The communication platform 706 may determine a current time associated with the second user 702 accessing the direct messaging instance 728 and may determine a time remaining until expiration. The communication platform 706 may include the time remaining (illustrated as 28 days) in the notification of messaging limitations 730.

In various examples, the direct messaging instance 728 may include an indication 732 of the direct messaging instance 728 being displayed. The indication 732 may provide a means by which the second user 702 may easily assess a particular direct messaging instance 728 being displayed via the interface 700c. For example, the indication 732 indicates that a direct messaging instance with Tony is currently being displayed and/or is active on the communication application 720.

In various examples, the direct messaging instance 728 includes information 734 associated with the first user 708, with whom the second user 702 may communicate. The information 734 may provide a means by which the second user 702 may quickly and easily identify the first user 708 and/or ascertain information about the first user 708. In the illustrative example, the information 734 includes an identity of the first user 708, an indication of whether the first user 708 is identified as a preferred person with whom to communicate (e.g., selectable star to indicate as preferred), an indication of whether the first user 708 is active or away (e.g., instance of the communication application associated with the first user 708 is not in use), a user name (e.g., handle) associated with the first user 708, and an organization associated with the first user 708. Though this is merely an illustration and additional and/or alternative information may be included in the information 734.

In various examples, the direct messaging instance 728 may provide an indication of a start of a conversation 736 between the first user 708 and the second user 702. In the illustrative example, the indication of the start of the conversation 736 includes information about the direct messaging instance 728, such as that only two people, the first user 708 and the second user 702 are in the conversation and that no one else can view the contents. In other examples, the indication of the start of the conversation may include other information, such as an additional warning that the first user 708 is associated with an organization that is different from an organization of the second user 702. In such an example, the additional warning may include an indication to be mindful of the documents and other information provided to the first user 708 via the direct messaging instance 728.

In various examples, the interface 700c may include a drafting window 738. The drafting window 738 may provide a means by which the second user 702 may draft messages to the first user 708. For example, Frank may initiate a conversation with Tony by drafting a first message. Responsive to sending the first message via the drafting window 738, the communication application 720 may present the first message in a messaging window below the indication of the start of the conversation 736. The messaging window may include a display of the messages associated with the direct messaging instance 728 between Frank and Tony, such as in chronological order.

In various examples, the interface 700c may include a selectable control 740 to open a shared communication channel between a first organization associated with the first user 708 and a second organization associated with the second user 702. The shared communication channel may include a communication tool with additional functionalities, such as instantaneous messaging with a plurality of individuals, data sharing among the plurality of individuals, and the like. In some examples, the shared communication channel may include a communication tool with an unlimited time duration. In some examples, the shared communication channel offers additional security, data retention, and organization specific policies that may be specified by each organization. For example, an organization may choose to only retain messages that are up to a week old in the shared communication channel. In such examples, the shared communication channel may persist for communications between at least the first user and the second user after a time period associated with the direct messaging instance 728 expires. In various examples, responsive to generating the shared communication channel, the direct messaging instance between the first user 708 and the second user 702 may be modified to include an unlimited duration.

In some examples, the shared communication channel may provide a means by which one or more users associated with the first organization may communicate with one or more users associated with the second organization. In such examples, the shared communication channel may provide a means for group collaboration with the first user 708, the second user 702, and additional users associated with the first organization and/or the second organization. In various examples, the selectable control 740 may provide a simplified, fast means of generating a robust collaboration tool between a plurality of users. In such examples, the simplified and fast generation of the shared communication channel may improve existing communication platforms and associated interfaces.

In various examples, the communication platform 706 may receive an indication of selection of the selectable control 740 and may send a request to approve the shared communication channel to an administrator associated with the first organization and an administrator associated with the second organization. For example, the communication platform 706 may send a first request for shared channel generation approval to a first administrator associated with Organization A and a second request for the shared communication channel generation approval to a second administrator associated with Organization B.

In some examples, based on receiving a disapproval from either the first administrator or the second administrator, the communication platform 706 may not generate the shared communication channel. In some examples, based on the disapproval, the communication platform 706 may present a notification of disapproval via the communication application 720. In such examples, the communication platform 706 may cause the notification to surface via the communication application 720.

Figure 7D:
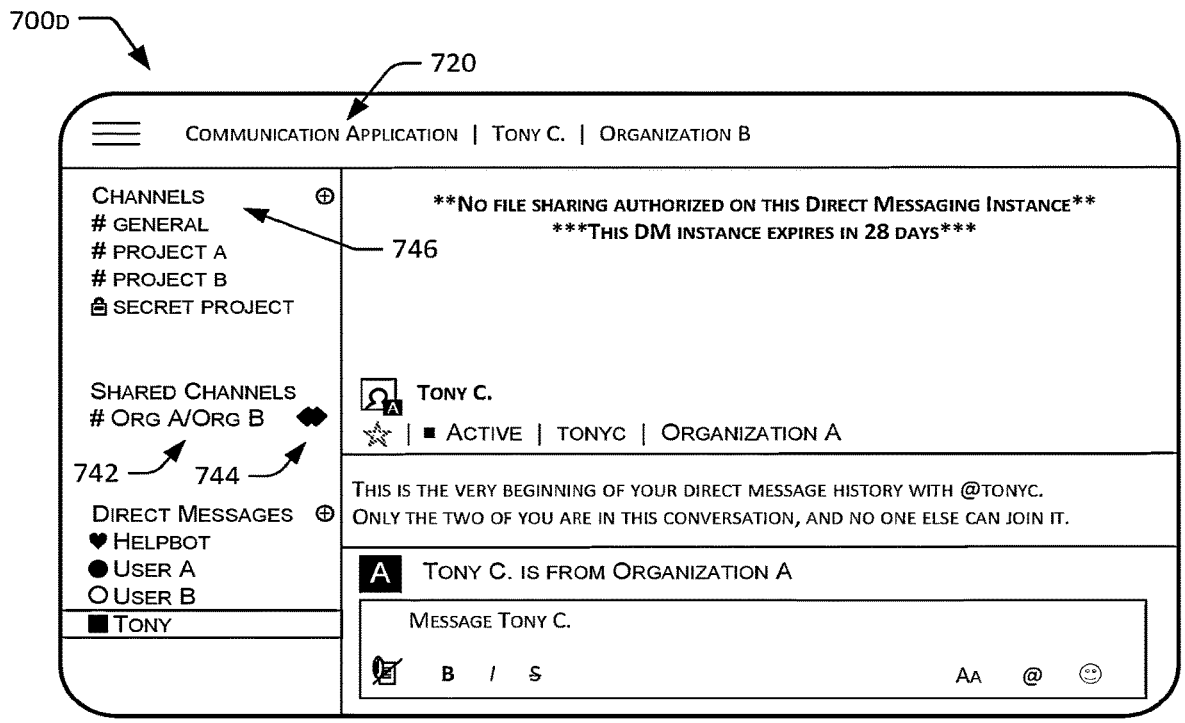

Based on receiving approval from the first administrator and the second administrator, the communication platform 706 may generate a shared communication channel between the first organization and the second organization. Interface 700D of FIG. 7D illustrates the communication application 720 with the generated shared channel 742. In various examples, the communication application 720 may present an indication 744 that the shared channel 742 includes people from different organizations. Though the indication 744 illustrated in FIG. 7D includes double black diamonds, this is merely an example and is not intended to be limiting. The indication may include any other type of letter, symbol, number, or the like to indicate that the shared channel 742 includes people from different organizations.

By way of contrast, the channels 746 include members within the second organization associated with the second user 702. The channels 746 may provide a means by which the second user 702 may communicate with select people associated with the second organization (e.g., those who have joined a channel 746). The shared channels 742 may provide a means by which the second user 702 may communicate with select people of the second organization and the first organization (e.g., those who have joined the shared channel 742).

Example Methods

FIGS. 3 and 8-12 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 8:
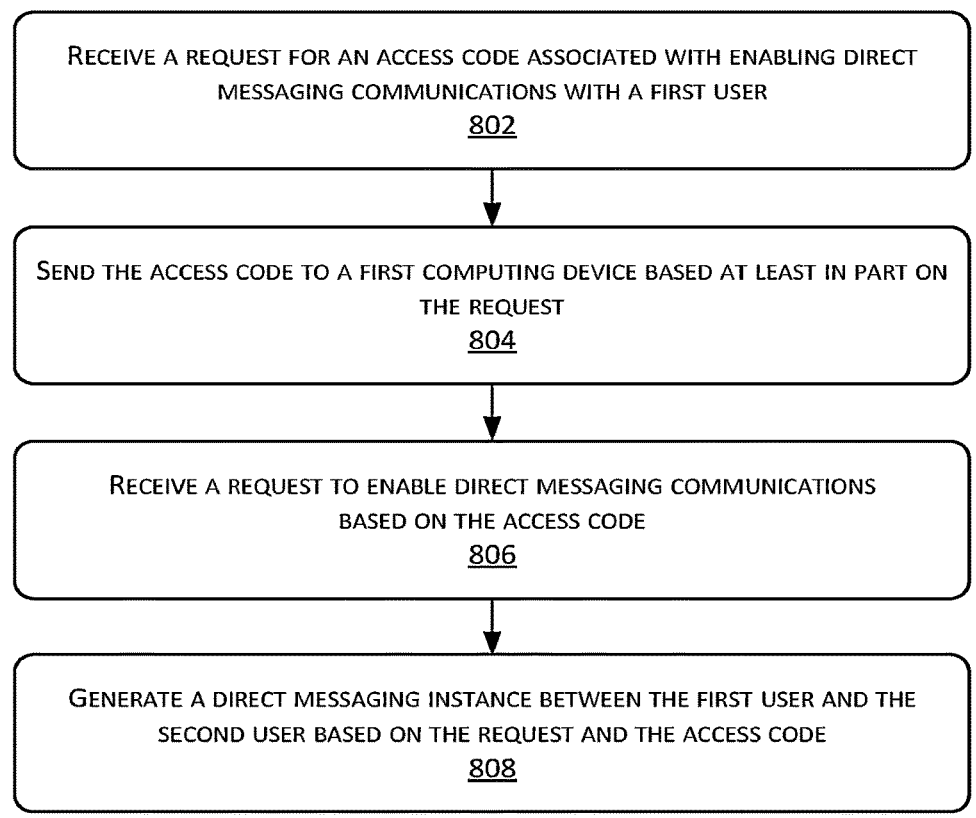
FIG. 8 illustrates an example process for generating a direct messaging instance, utilizing the techniques described herein.

FIG. 8 illustrates an example process 800 for generating a direct messaging instance. In some instances, some or all of process 800 may be performed by one or more components in the systems 100 or 200. By way of example and not limitation, the communication platform computing device referred to in process 800 may be representative of a computing device associated with the communication platform server(s) 102 and/or communication platform 204, the first user device referred to in process 800 may be representative of the first computing device(s) 104 and/or the first user device(s) 206 and the second user device referred to in process 800 may be representative of the second computing device(s) 106 and/or the second user device(s) 210. However, the process 800 is not limited to being performed by the system 100 or 200.

At operation 802, the communication platform computing device receives a request for an access code associated with enabling direct messaging communications with a first user. The access code may include a unique identifier associated with generating a direct messaging instance with the first user. The access code may include a token that links the access code to the first user. The access code may include a QR code, a micro QR code, a URL, or any other type of discrete code associated with the direct messaging instance with the first user.

In some examples, the access code may be active for a limited duration. In such examples, the access code may be used to generate a direct messaging instance with the first user for a pre-determined time period (e.g., 7 days, 10 days, etc.). In some examples, the access code may be active for an unlimited duration. In such examples, the access code may be used to generate a direct messaging instance with the first user until the access code is revoked by the first user and/or an administrator associated with an organization of the first user.

In various examples, the request may include a request for a single-use access code. In such examples, the access code may be used a single time by a second user to enable direct messaging communications. In some examples, the request may include a request for a multi-use access code. In such examples, the multi-use access code may be used by multiple individuals to enable distinct (one-on-one) direct messaging communications with the first user.

In various examples, the communication platform may receive the request from a first user device associated with the first user. In some examples, the communication platform may receive the request via an instance of a communication application managed by the communication platform.

In various examples, the request may include a generic request to generate an access code associated with the first user communicating with one or more other users via a direct messaging instance. In such examples, the request may not include identifying information about an intended recipient of the access code (e.g., other potential communicating party is not identified). For example, the first user may request an access code to print on a business card or to email to select individuals at a future time.

In some examples, the request may include second user data associated with a second user for which the access code (and an associated invitation to direct message) is intended. The second user data may include a name, associated organization, contact information (e.g., an email address, telephone number, etc.), or any other data usable to identify and/or provide the access code. For example, the first user may include a name and an email address associated with the second user in the request. The communication platform may identify the second user based on the second user data (e.g., name and email address).

In various examples, the request may include a type of code (e.g., QR code, micro QR code, URL, etc.) to be generated. In some examples, the request may include a means by which the access code will be provided to the second user. The means may include via email, text message, a social networking message, or the like. In some examples, the communication platform may determine the type of access code based on the means by which the access code will be provided. For example, the first user may request for the communication platform to send a request to an email associated with the second user. Based in part on the email delivery, the communication platform may determine to generate a QR code as the access code.

At operation 804, the communication platform computing device may send the access code to a first computing device based at least in part on the request. In various examples, the communication platform computing device may generate the access code based on the request and send the access code to the first computing device. In some examples, the may generate a particular type of access code based on the data provided in the request (e.g., means of communication, requested type of code, etc.). In some examples, the communication platform may generate the code based on a default setting. For example, the communication platform computing device may default to generating QR codes in response to receiving the requests.

Additionally or alternatively, the communication platform computing device may send the access code to a second computing device associated with a second user. As discussed above, the first user may provide user data associated with the second user in the request. Based on the user data, the communication platform may identify the second user and/or send the access code to the second user device.

At operation 806, the communication platform computing device may receive a request to enable direct messaging communications based on the access code. In some examples, the request may include a selection, activation, scan, or other action associated with the access code. In various examples, the request may include user data associated with a second user. The user data may include a name, email address, Internet Protocol address, user device identifier, or other means by which the second user may be identified. In various examples, communication platform computing device may receive the user data and/or an indication of selection (e.g., activation, scan, etc.) of the access code and may determine the first user associated therewith.

In various examples, the request may include an acceptance of an invitation to direct message with the first user. In some examples, responsive to the second user selecting (e.g., activating, scanning, etc.) the access code, the communication platform computing device may cause a selection to accept the invitation to communicate with the identified first user to be presented on the second user device. In such examples, the request to enable direct messaging communications may include an indication of the selection to accept the invitation.

At operation 808, the communication platform computing device may generate a direct messaging instance between the first user and the second user based on the request and the access code. In some examples, the communication platform computing device may generate the direct messaging instance based on a determination that a user account associated with the second user and organizational preferences associated with the second user support direct messaging instances generated based on access codes. Based on a determination that the user account and organizational preferences support an expedited, improved direct messaging instance generation, the communication platform computing device may generate the direct messaging instance.

In various examples, communication platform computing device may first (prior to generating the direct messaging instance) determine whether the second user is associated with the communication platform. Based on a determination that the second user is associated with the communication platform, the communication platform computing device may generate the direct messaging instance.

Based on a determination that the second user is not associated with the communication platform, the communication platform computing device may first generate a user account associated with the second user. In some examples, the communication platform computing device may generate the user account utilizing a minimal amount of information from the second user. For example, the communication platform computing device may generate the account using the name and email address associated with the second user. At least because the communication platform computing device may quickly and with minimal amount of information generate a user account to facilitate expedited communications between the first user and the second user, the techniques described herein may improve upon existing communication systems that involve onerous and time-consuming onboarding processes.

FIG. 9 illustrates an example process 900 for revoking an invitation to communicate via a direct messaging instance. In some instances, some or all of process 900 may be performed by one or more components in the systems 100 or 200. By way of example and not limitation, the communication platform computing device referred to in process 900 may be representative of a computing device associated with the communication platform server(s) 102 and/or communication platform 204, the first user device referred to in process 900 may be representative of the first computing device(s) 104 and/or the first user device(s) 206 and the second user device referred to in process 900 may be representative of the second computing device(s) 106 and/or the second user device(s) 210. However, the process 900 is not limited to being performed by the system 100 or 200.

At operation 902, the communication platform computing device receives, at a first time from a first computing device associated with a first user, a first instruction to generate an invitation to communicate via a direct messaging instance. The direct messaging instance may be managed by a communication platform. The instruction may include a request for an access code, such as that described above. In various examples, the invitation may include the access code.

In various examples, the instruction may include a request to send the invitation to a second user. In such examples, the instruction may include an identifier (e.g., name, email address, telephone number, social networking handle, etc.) associated with the second user.

At operation 904, the communication platform computing device generates the invitation based at least in part on the first instruction. In various examples, the communication platform computing device may link the access code associated with the invitation to the first user, such as via a token.

At operation 906, the communication platform computing device sends the invitation to a second computing device associated with the second user. In various examples, the communication platform computing device may send the invitation based on information provided in the instruction. For example, the instruction may provide a telephone number associated with the second user. The communication platform computing device may send the invitation via text message to the telephone number. In various examples, the communication platform computing device may send the invitation via a means designated in the instruction. In such examples, the first user may indicate the means via which the invitation is to be communicated and the communication platform computing device may send the invitation via the means. For example, the first user may instruct the communication platform computing device to send an invitation to direct message to a second user via email. Based on the instruction, the communication platform computing device may generate the invitation (including the access code) and email it to the second user.

At operation 908, the communication platform computing device receives, at a second time after the first time and from the first computing device, a second instruction to revoke the invitation. In various examples, responsive to receiving the second instruction to revoke the invitation, the communication platform computing device may modify a token associated with the access code, such as to remove an association between the access code and the first user. In some examples, responsive to receiving the second instruction to revoke the invitation, the communication platform computing device modifies a permission and/or setting associated with the access code and/or a user account associated with the first user. In some examples, responsive to receiving the second instruction to revoke the invitation, the communication platform computing device associates an indication of invalidity with the access code. In such examples, responsive to receiving an indication of an attempt to activate the access code, such as by the second user, the communication platform may determine that the access code is no longer valid.

At operation 910, the communication platform computing device receives, at a third time after the second time and from the second computing device, a request to enable direct messaging communications with the first user. In some examples, the request may include a selection, activation, scan, or other action associated with the access code included in the invitation. In various examples, the request may include user data associated with a second user. The user data may include a name, email address, Internet Protocol address, user device identifier, or other means by which the second user may be identified. In various examples, communication platform computing device may receive the user data and/or an indication of selection (e.g., activation, scan, etc.) of the access code and may identify the first user associated therewith.

In various examples, the communication platform computing device may determine that the first user revoked the invitation at the second time. In such examples, the communication platform computing device may determine that the invitation is no longer valid (e.g., invitation is invalid).

At operation 912, the communication platform computing device causes a notification that the invitation has been revoked to be presented on a display associated with the second computing device. In some examples, the notification may be surfaced via a communication application managed by the communication platform computing device. In some examples, the notification may include a push notification. In some examples, the notification may be sent via the means of communication to which the communication platform computing device previously sent the invitation.

Figure 10:
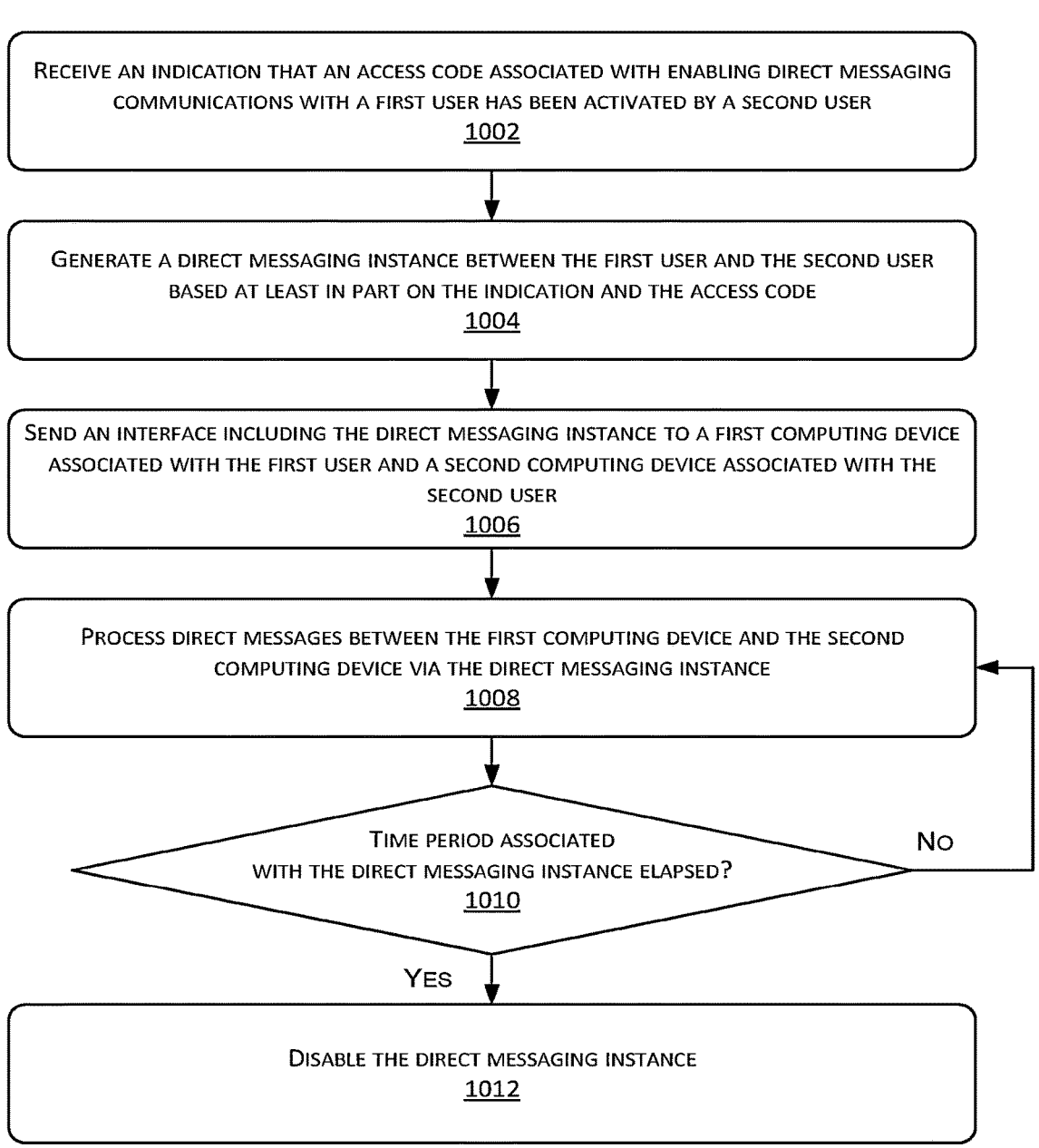
FIG. 10 illustrates an example process for disabling a direct messaging instance after a time period, utilizing the techniques described herein.

FIG. 10 illustrates an example process 1000 for disabling a direct messaging instance after a time period. In some instances, some or all of process 1000 may be performed by one or more components in the systems 100 or 200. By way of example and not limitation, the communication platform computing device referred to in process 1000 may be representative of a computing device associated with the communication platform server(s) 102 and/or the communication platform 204, the first user device referred to in process 1000 may be representative of the first computing device(s) 104 and/or the first user device(s) 206 and the second user device referred to in process 1000 may be representative of the second computing device(s) 106 and/or the second user device(s) 210. However, the process 1000 is not limited to being performed by the system 100 or 200.

At operation 1002, the communication platform computing device receives an indication that an access code associated with enabling direct messaging communications with a first user has been activated by a second user. The indication may be provided based on the second user scanning the access code, clicking on the access code, or performing another action indicative of a request to enable the direct messaging communications with the first user.

At operation 1004, the communication platform computing device generates a direct messaging instance between the first user and the second user based at least in part on the indication and the access code. In some examples, the communication platform computing device may generate the direct messaging instance based on a determination that a user account associated with the second user and organizational preferences associated with the second user support direct messaging instances generated based on access codes. Based on a determination that the user account and organizational preferences support the direct messaging communications based on access codes, the communication platform computing device may generate the direct messaging instance.

In various examples, communication platform computing device may first (prior to generating the direct messaging instance) determine whether the second user is associated with the communication platform. Based on a determination that the second user is associated with the communication platform, the communication platform computing device may generate the direct messaging instance.

Based on a determination that the second user is not associated with the communication platform, the communication platform computing device may first generate a user account associated with the second user. In some examples, the communication platform computing device may generate the user account utilizing a minimal amount of information from the second user. For example, the communication platform computing device may generate the account using the name and email address associated with the second user. At least because the communication platform computing device may quickly and with minimal amount of information generate a user account to facilitate expedited communications between the first user and the second user, the techniques described herein may improve upon existing communication systems that involve onerous and time-consuming onboarding processes.

At operation 1006, the communication platform computing device sends an interface including the direct messaging instance to a first computing device associated with the first user and a second computing device associated with the second user. The interface may include any one of interfaces 400c, 500c, 600c, 700c, and/or 700D described above with respect to FIGS. 4C, 5C, 6C, 7C, and 7D. The interface provides a means by which the second user may draft and send messages, files, reactions (e.g., via emojis), and the like to the first user in a one-on-one conversation therewith. Additionally, the interface provides a means by which the second user may read messages from the first user.

At operation 1008, the communication platform computing device processes direct messages between the first computing device and the second computing device via the direct messaging instance. In some examples, the messages generated via the interface may include a unique identifier associating the messages with the direct messaging instance. In some examples, the unique identifier may enable the communication platform computing device to route the messages to the appropriate recipient. In some examples, the unique identifier may be associated with a data shard in which the messages associated with the direct messaging instance may be stored.

At operation 1010, the communication platform computing device determines whether a time period associated with the direct messaging instance has elapsed. In some examples, the direct messaging instance generated based on the access code may include a time period of activation (e.g., 5 days, 8 days, 1 month, 3 months, etc.). The time period may be a time in which the direct messaging instance may be enabled to send and receive messages therethrough.

In some examples, the direct messaging instance may be associated with a particular project. In some examples, the first user may provide an indication that the direct messaging instance is associated with the particular project, such as when requesting the access code associated therewith. Based on the indication, the communication platform computing device may associate the direct messaging instance with the particular project and may determine the time period based on the particular project. For example, a project may include a start date and an end date. The communication platform computing device may determine the time period associated with the direct messaging instance based on the end date associated with the project.

In various examples, the first user may provide an indication to the communication platform computing device that the project is complete. Based on the indication of project completion, the communication platform computing device may determine that the time period associated with the direct messaging instance has elapsed.

Based on a determination that the time period associated with the direct messaging instance has not elapsed ("No" at operation 1010), the communication platform computing device may continue to process direct messages between the first computing device and the second computing device via the direct messaging instance, such as that described with regard to operation 1008.

Based on a determination that the time period associated with the direct messaging instance has elapsed ("Yes" at operation 1010), the communication platform computing device may, at operation 1012, disable the direct messaging instance. In various examples, the communication platform computing device may disable the direct messaging instance by disabling input via the interface associated therewith. In such examples, the first user and the second user may be restricted from drafting and/or sending additional messages in the direct messaging instance. In various examples, the communication platform computing device may store the messages associated with the direct messaging instance in a datastore (e.g., a data shard dedicated to the direct messaging instance). In such examples, the messages associated with the direct messaging instance may be accessible for viewing by the first user and/or the second user, such as via an instance of the communication application.

Figure 11:
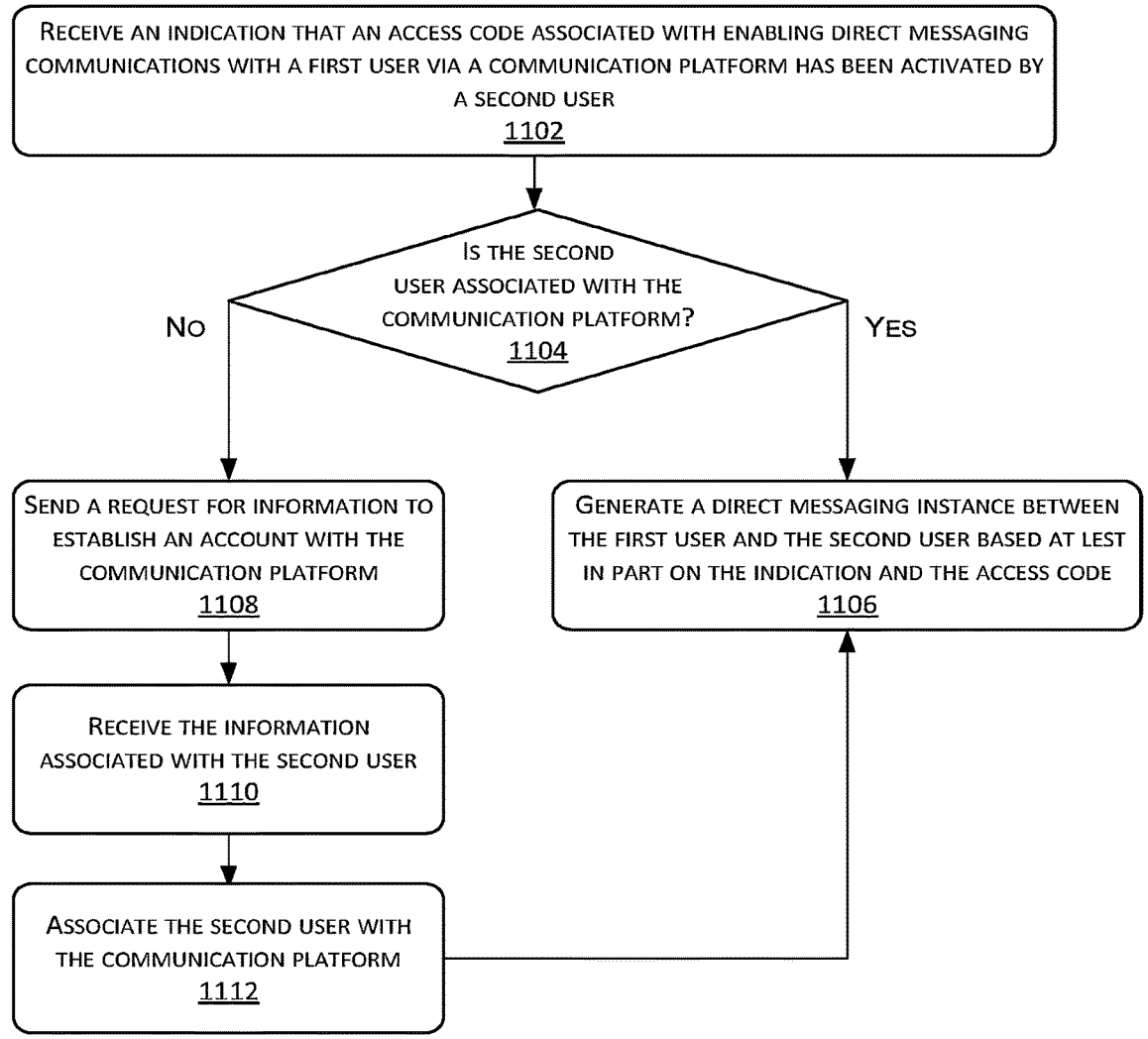
FIG. 11 illustrates an example process for generating a direct messaging instance between a first user that is associated with a communication platform and a second user that is not associated with the communication platform, utilizing the techniques described herein.

FIG. 11 illustrates an example process 1100 for generating a direct messaging instance between a first user that is associated with a communication platform and a second user that is not associated with the communication platform. In some instances, some or all of process 1100 may be performed by one or more components in the systems 100 or 200. By way of example and not limitation, the communication platform computing device referred to in process 1100 may be representative of a computing device associated with the communication platform server(s) 102 and/or the communication platform 204, the first user device referred to in process 1100 may be representative of the first computing device(s) 104 and/or the first user device(s) 206 and the second user device referred to in process 1100 may be representative of the second computing device(s) 106 and/or the second user device(s) 210. However, the process 1100 is not limited to being performed by the system 100 or 200.

At operation 1102, the communication platform computing device receives an indication that an access code associated with enabling direct messaging communications with a first user via a communication platform has been activated by a second user. The indication may be provided based on the second user scanning the access code, clicking on the access code, or performing another action indicative of a request to enable the direct messaging communications with the first user.

At operation 1104, the communication platform computing device determines whether the second user is associated with the communication platform. In various examples, the communication platform computing device accesses one or more user profiles and/or user accounts associated with the communication platform to determine whether the second user is associated with the communication platform. In such examples, based on a determination that the second user is associated with a user profile and/or a user account, the communication platform computing device determines that the second user is associated with the communication platform.

Based on a determination that the second user is associated with the communication platform ("Yes" at operation 1104), the communication platform computing device, at operation 1106, generates the direct messaging instance between the first user and the second user based at least in part on the indication and the access code. The direct messaging instance may include a means by which the first user and the second user may send and receive messages to one another in a one-on-one conversation.

In some examples, the communication platform computing device may generate the direct messaging instance based on a determination that a user account associated with the second user and organizational preferences associated with the second user support direct messaging instances generated based on access codes. Based on a determination that the user account and organizational preferences support the direct messaging communications based on access codes, the communication platform computing device may generate the direct messaging instance.

Based on a determination that the second user is not associated with the communication platform ("No" at operation 1104), the communication platform computing device, at operation 1108, sends a request for information to establish an account with the communication platform. The information may include a name, email address, telephone number, social networking handle, or other user data associated with the second user. In some examples, the information may include a minimum amount of information requested by the communication platform computing device to establish a direct messaging instance with the second user. In some examples, the minimum amount of information may be based on organization data, such as organizational preferences, rules, etc., associated with a first organization of the first user. In some examples, the information may include an acceptance of terms and conditions associated with communicating via the communication platform.

At operation 1110, the communication platform computing device receives the information associated with the second user.

At operation 1112, the communication platform computing device associates the second user with the communication platform. In some examples, an association may include generating a user account associated with the second user. In various examples, the association may include storing the user data in a user profile associated with the second user and/or the user account.

In various examples, after associating the second user with the communication platform, the communication platform computing device may generate the direct messaging instance between the first user and the second user, such as that described above with regard to operation 1106.

Figure 12:
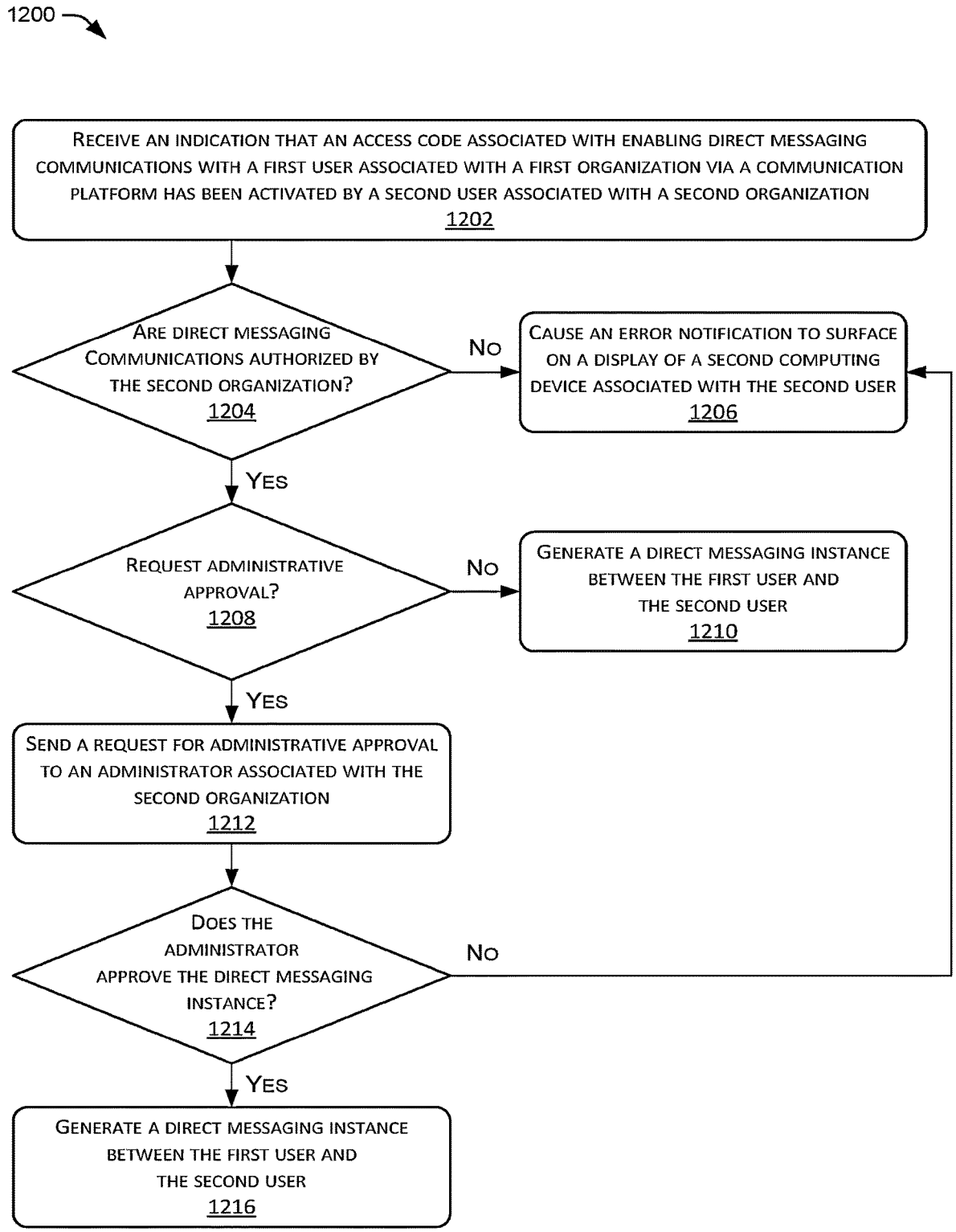
FIG. 12 illustrates an example process for generating a direct messaging instance between a first user and a second user, utilizing the techniques described herein.

FIG. 12 illustrates an example process 1200 for generating a direct messaging instance between a first user and a second user. In some instances, some or all of process 1200 may be performed by one or more components in the systems 100 or 200. By way of example and not limitation, the communication platform computing device referred to in process 1200 may be representative of a computing device associated with the communication platform server(s) 102 and/or the communication platform 204, the first user device referred to in process 1200 may be representative of the first computing device(s) 104 and/or the first user device(s) 206 and the second user device referred to in process 1200 may be representative of the second computing device(s) 106 and/or the second user device(s) 210. However, the process 1200 is not limited to being performed by the system 100 or 200.

At operation 1202, the communication platform computing device receives an indication that an access code associated with enabling direct messaging communications with a first user associated with a first organization via a communication platform has been activated by a second user associated with a second organization. The indication may be provided based on the second user scanning the access code, clicking on the access code, or performing another action indicative of a request to enable the direct messaging communications with the first user. In at least one example, the first organization and the second organization are different and distinct organizations. For example, the first organization may include a first business and the second organization may include a second business.

At operation 1204, the communication platform computing device determines whether direct messaging communications are authorized by the second organization. In some examples, the communication platform computing device may access one or more organizational preference associated with the second organization to determine whether direct messaging communications are authorized by the second organization.

Based on a determination that the direct messaging communications are not authorized by the second organization ("No" at operation 1204), the communication platform computing device, at operation 1206, causes an error notification to present on a display of a second computing device associated with the second user. The error notification may be presented via a communication application. In some examples, the error notification may be sent as a push notification, a helpbot message, text message, or other message in which the notification may be presented to the second user.

In various examples, the error notification may indicate that the direct messaging communications based on an access code are not authorized. In some examples, the error notification may provide an organizational preference associated with the second organization that prevents direct messaging communications based on access codes. In some examples, the error notification may provide a message to contact a system administrator.

Based on a determination that the direct messaging communications are authorized by the second organization ("Yes" at operation 1204), the communication platform computing device, at operation 1208 may determine whether administrative approval is required by the second organization prior to permitting communications via the direct messaging instance based on the access code.

Based on a determination that the administrative approval is not required ("No" at operation 1208) the communication platform computing device, at operation 1210 generates a direct messaging instance between the first user and the second user, as described above.

Based on a determination that the administrative approval is required ("Yes" at operation 1208) the communication platform computing device, at operation 1212 sends a request for administrative approval to an administrator associated with the second organization. The communication platform computing device may identify the administrator based on organization data associated with the second organization.

At operation 1214, the communication platform computing device determines whether the administrator approves the direct messaging instance between the first user and the second user based on the access code.

Based on a determination that administrator does not approve the direct messaging instance ("No" at operation 1214) the communication platform computing device causes an error notification to present on a display of the second computing device associated with the second user, such as that described with regard to operation 1206.

Based on a determination that administrator does approve the direct messaging instance ("Yes" at operation 1214) the communication platform computing device, at operation 1216, generates a direct messaging instance between the first user and the second user, as described above.

As stated above, the order in which the operations are described is not intended to be construed as a limitation, and any number of the described operations may be combined in any order and/or in parallel to implement the processes. In some embodiments, one or more operations of the above-described methods may be omitted entirely. By way of example and not limitation, operations 1002-1008 may be performed without operations 1010-1012 and/or operations 1102, 1104, and 1112 may be performed without operations 1106-1110. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

A: A method, implemented at least in part by a server computing device associated with a communication platform, the method comprising: receiving, from a first computing device associated with a first user, an instruction to generate an invitation to communicate via a direct messaging instance managed by the communication platform, wherein the invitation comprises an access code associated with enabling direct messaging communications with the first user; generating the invitation based at least in part on the instruction, wherein the invitation comprises the access code; sending the invitation to a second computing device associated with a second user, wherein the second user is associated with a second organization that is different from a first organization associated with the first user; receiving an indication that the access code has been selected by the second user; based at least in part on the received indication and the access code, generating the direct messaging instance between the first user and the second user, wherein the direct messaging instance enables messages to be transmitted between the first computing device and the second computing device; and sending an interface including the direct messaging instance to the first computing device and the second computing device.

B: The method as paragraph A describes, further comprising: determining that a time period associated with the direct messaging instance has elapsed; and based at least in part on determining that the time period has elapsed, disabling the direct messaging instance.

C: The method as either of paragraphs A or B describe, further comprising: determining that the second user is not associated with the communication platform; sending, to the second computing device, a request for information to establish an account with the communication platform; receiving, from the second computing device, the information associated with the account; and associating the second user with the communication platform based at least in part on the information, wherein the direct messaging instance is generated based at least in part on associating the second user with the communication platform.

D: The method as any one of paragraphs A-C describe, wherein the access code comprises at least one of: a quick response code; or a uniform resource locator.

E: The method as any one of paragraphs A-D describe, further comprising: receiving, from at least one of the first computing device or the second computing device, a second indication of selection of a selectable control associated with generating a shared communication channel between the first organization associated with the first user and the second organization associated with the second user, the shared communication channel being managed by the communication platform and comprising an unlimited duration; based at least in part on the second indication, sending a first request for approval of the shared communication channel to a first administrator associated with the first organization and a second request for approval of the shared communication channel to a second administrator associated with the second organization; receiving a first approval from the first administrator and a second approval from the second administrator; and enabling, by the shared communication channel, communication between one or more first computing devices associated with the first organization and one or more second computing devices associated with the second organization.

F: The method as any one of paragraphs A-E describe, further comprising: receiving, from the first computing device at a first time, a second instruction to generate a second invitation to communicate via a second direct messaging instance managed by the communication platform; generating the second invitation based at least in part on the second instruction; receiving, from the first computing device at a second time after the first time, a third instruction to revoke the second invitation; receiving, from a third computing device associated with a third user at a third time after the second time, a second indication that the second invitation has been accepted by the third user; and causing a notification that the second invitation has been revoked to present on a display associated with the third computing device.

G: A system or device comprising: a processor; and a non-transitory computer-readable medium storing instructions that, when executed, cause a processor to perform a computer-implemented method as any one of paragraphs A-F describe.

H: A system or device comprising: a means for processing; and a means for storing coupled to the means for processing, the means for storing including instructions to configure one or more devices to perform a computer-implemented method as any one of paragraphs A-F describe.

I: A system comprising: one or more processors; and computer readable media storing instructions that, when executed, cause the system to perform operations comprising: receiving, from a first computing device associated with a first user, a request for an access code associated with enabling direct messaging communications with the first user via a communication platform; sending the access code to the first computing device based at least in part on the request; receiving, from a second computing device associated with a second user, a request to enable direct messaging communications based on the access code, the second user being associated with a second organization that is different from a first organization associated with the first user; and based at least in part on the request from the second computing device and the access code, generating a direct messaging instance between the first user and the second user, wherein the direct messaging instance enables messages to be transmitted between the first computing device and the second computing device via the communication platform.

J: The system as paragraph I describes, the operations further comprising: sending an interface including the direct messaging instance to the first computing device and the second computing device.

K: The system as either one of paragraphs I or J describe, wherein the access code comprises at least one of: a quick response code; or a uniform resource locator.

L: The system as any one of paragraphs I-K describe, the operations further comprising: determining that a time period associated with the direct messaging instance has elapsed; and based at least in part on determining that the time period has elapsed, disabling the direct messaging instance.

M: The system as any one of paragraphs I-L describe, the operations further comprising: determining that the second user is not associated with the communication platform; sending, to the second computing device, a request for information to establish an account with the communication platform; receiving, from the second computing device, the information associated with the account; and associating the second user with the communication platform based at least in part on the information, wherein the direct messaging instance is generated based at least in part on associating the second user with the communication platform.

N: The system as any one of paragraphs I-M describe, wherein the request for the access code is a first request for a first access code, the operations further comprising: receiving, from the first computing device at a first time, a second request for a second access code associated with enabling direct messaging communications with the first user via a second direct messaging instance managed by the communication platform; generating the second access code based at least in part on the second request; receiving, from the first computing device at a second time after the first time, an instruction to disable direct messaging communications associated with the second access code; receiving, from a third computing device associated with a third user at a third time after the second time, a second indication of an attempt by the third user to enable direct messaging communications based on the second access code; and causing a notification that the second access code has been disabled to be presented on a display associated with the third computing device.

O: The system as any one of paragraphs I-N describe, the operations further comprising: receiving, from at least one of the first computing device or the second computing device, a second indication of selection of a selectable control associated with generating a shared communication channel between the first organization associated with the first user and the second organization associated with the second user, the shared communication channel being managed by the communication platform and comprising an unlimited duration; based at least in part on the second indication, sending a first request for approval of the shared communication channel to a first administrator associated with the first organization and a second request for approval of the shared communication channel to a second administrator associated with the second organization; receiving a first approval from the first administrator and a second approval from the second administrator; and enabling, by the shared communication channel, communication between one or more first computing devices associated with the first organization and one or more second computing devices associated with the second organization.

P: The system as paragraph O describes, wherein: the direct messaging instance has a limited duration; and the shared communication channel has an unlimited duration.

Q: One or more non-transitory computer readable media storing computer-executable instructions that, when executed by one or more processors of a computing device, cause the computing device to perform operations comprising: receiving, from a first computing device associated with a first user, an instruction to generate an invitation to communicate via a direct messaging instance managed by a communication platform, wherein the invitation comprises an access code associated with enabling direct messaging communications with the first user; generating the invitation based at least in part on the instruction, wherein the invitation comprises the access code; sending the invitation to at least one of the first computing device or a second computing device associated with a second user, wherein the second user is associated with a second organization that is different from a first organization associated with the first user; receiving, from the second computing device, a request to enable direct messaging communications based on the access code; and based at least in part on the received request from the second computing device and the access code, generating the direct messaging instance between the first user and the second user, wherein the direct messaging instance enables messages to be transmitted between the first computing device and the second computing device via the communication platform.

R: The one or more non-transitory computer readable media as paragraph Q describes, the operations further comprising: sending an interface including the direct messaging instance to the first computing device and the second computing device.

S: The one or more non-transitory computer readable media as either one of paragraphs Q or R describe, the operations further comprising: receiving, from the first computing device at a first time, a second instruction to generate a second invitation to communicate via a second direct messaging instance managed by the communication platform; generating the second invitation based at least in part on the second instruction; receiving, from the first computing device at a second time after the first time, a third instruction to revoke the second invitation; receiving, from a third computing device associated with a third user at a third time after the second time, a second request to enable direct messaging communications with the first user based on the second invitation; and causing the third computing device to present, via a display, a notification that the second invitation has been revoked.

T: The one or more non-transitory computer readable media as any one of paragraphs Q-S, the operations further comprising: determining that a time period associated with the direct messaging instance has elapsed; and based at least in part on determining that the time period has elapsed, disabling the direct messaging instance.

U: The one or more non-transitory computer readable media as any one of paragraphs Q-T describe, the operations further comprising: determining that the second user is not associated with the communication platform; sending, to the second computing device, a request for information to establish an account with the communication platform; receiving, from the second computing device, the information associated with the account; and associating the second user with the communication platform based at least in part on the information, wherein the direct messaging instance is generated based at least in part on associating the second user with the communication platform.

V: The one or more non-transitory computer readable media as any one of paragraphs Q-U describe, wherein the access code comprises at least one of: a quick response code; or a uniform resource locator.

While the example clauses described above are described with respect to one particular implementation, it should be understood that, in the context of this document, the content of the example clauses can also be implemented via a method, device, system, a computer-readable medium, and/or another implementation. Additionally, any of examples A-V may be implemented alone or in combination with any other one or more of the examples A-V.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more non-transitory computer readable media storing instructions that, when executed, cause the system to perform operations comprising:
receiving, from a first computing device associated with a first user, a request to generate an invitation for enabling the first user to communicate with a second user of an outside organization via a shared communication channel of a communication platform, wherein the invitation is accessible to the second user via a second computing device;
receiving, from the second computing device, acceptance of the invitation to communicate with the first user via the communication platform based at least in part on an identifier associated with the invitation; and
based at least in part on the acceptance from the second computing device, generating the shared communication channel between the first user and the second user, wherein an instance of the shared communication channel is displayed in an interface of the outside organization as a shared channel, wherein the shared communication channel enables communications to be transmitted between the first computing device and the second computing device via the communication platform.

2. The system of claim 1, the operations further comprising:
  receiving the request without receiving an approval from an administrator of a communication platform account associated with the first user.

3. The system of claim 1, wherein the request is a first request, the operations further comprising:
  based at least in part on a determination that the second user is not associated with the communication platform, sending, to the second computing device, a second request for information; and
  receiving, from the second computing device, the information,
  wherein the shared communication channel is generated based at least in part on the information.

4. The system of claim 1, wherein the interface is a first interface, the operations further comprising:
  modifying a second interface associated with the first user to include the shared communication channel; and
  causing a modified interface to be presented on a display of the first computing device.

5. The system of claim 1, the operations further comprising:
  based at least in part on a determination that the second user is associated with the communication platform, causing a workspace selection interface to be presented on a display of the second computing device; and
  receiving, from the second computing device, an indication of selection of a workspace via the workspace selection interface,
  wherein the shared communication channel is generated based at least in part on the indication of selection of the workspace.

6. The system of claim 1, wherein the request to generate the invitation is received at a first time, the operations further comprising:
  receiving, at a second time prior to the first time and from a third computing device associated with an administrator, an authorization to generate invitations to enable the first user to communicate with at least one other user via the communication platform; and
  based at least in part on receiving the authorization and the request for the invitation, generating the invitation.

7. A method comprising:
  receiving, from a first computing device associated with a first user, a request to generate an invitation for enabling the first user to communicate with a second user of an outside organization via a shared communication channel of a communication platform wherein the invitation is accessible to the second user via a second computing device;
  receiving, from the second computing device, acceptance of the invitation to communicate with the first user via the communication platform based at least in part on an identifier associated with the invitation; and
  based at least in part on the acceptance from the second computing device, generating the shared communication channel between the first user and the second user, wherein an instance of the shared communication channel is displayed in an interface of the outside organization as a shared channel, wherein the shared communication channel enables communications to be transmitted between the first computing device and the second computing device via the communication platform.

8. The method of claim 7, further comprising receiving the request without receiving an approval from an administrator of a communication platform account associated with the first user.

9. The method of claim 7, wherein the request is a first request, further comprising:
  based at least in part on a determination that the second user is not associated with the communication platform, sending, to the second computing device, a second request for information; and
  receiving, from the second computing device, the information,
  wherein the shared communication channel is generated based at least in part on the information.

10. The method of claim 7, wherein the interface is a first interface, the method further comprising:
  modifying a second interface associated with the first user to include the shared communication channel; and
  causing a modified interface to be presented on a display of the first computing device.

11. The method of claim 7, further comprising:
  based at least in part on a determination that the second user is associated with the communication platform, causing a workspace selection interface to be presented on a display of the second computing device; and
  receiving, from the second computing device, an indication of selection of a workspace via the workspace selection interface,
  wherein the shared communication channel is generated based at least in part on the indication of selection of the workspace.

12. The method of claim 7, wherein the second computing device is not associated with an instance of an application associated with the communication platform, the method further comprising:
  causing a download selectable option to be presented on a display associated with the second computing device, the download selectable option enabling the second user to download the instance of the application on the second computing device;
  receiving an indication of selection of the download selectable option;
  causing the instance of the application to be downloaded to the second computing device based at least in part on the indication of selection; and
  receiving a user input via the instance of the application,
  wherein generating the shared communication channel is based at least in part on the user input.

13. The method of claim 7, wherein the request to generate the invitation is received at a first time, the method further comprising:
  receiving, at a second time prior to the first time and from a third computing device associated with an administrator, an authorization to generate invitations to enable the first user to communicate with at least one other user via the communication platform; and
  based at least in part on receiving the request for the invitation, generating the invitation.

14. One or more non-transitory computer readable media storing computer-executable instructions that, when executed by one or more processors of a computing device, cause the computing device to perform operations comprising:
  receiving, from a first computing device associated with a first user, a request to generate an invitation for enabling the first user to communicate with a second user of an outside organization via a shared communication channel of a communication platform wherein the invitation is accessible to the second user via a second computing device;

receiving, from the second computing device, acceptance of the invitation to communicate with the first user via the communication platform based at least in part on an identifier associated with the invitation; and based at least in part on the acceptance from the second computing device, generating the shared communication channel between the first user and the second user, wherein an instance of the shared communication channel is displayed in an interface of the outside organization as a shared channel, wherein the shared communication channel enables communications to be transmitted between the first computing device and the second computing device via the communication platform.

15. The one or more non-transitory computer readable media of claim 14, the operations further comprising receiving the request without receiving an approval from an administrator of a communication platform account associated with the first user.

16. The one or more non-transitory computer readable media of claim 14, wherein the request is a first request, the operations further comprising:

based at least in part on a determination that the second user is not associated with the communication platform, sending, to the second computing device, a second request for information; and receiving, from the second computing device, the information, wherein the shared communication channel is generated based at least in part on the information.

17. The one or more non-transitory computer readable media of claim 14, wherein the interface is a first interface, the operations further comprising:

modifying a second interface associated with the first user to include the shared communication channel; and causing a modified interface to be presented on a display of the first computing device.

18. The one or more non-transitory computer readable media of claim 14, the operations further comprising:

based at least in part on a determination that the second user is associated with the communication platform, causing a workspace selection interface to be presented on a display of the second computing device; and receiving, from the second computing device, an indication of selection of a workspace via the workspace selection interface, wherein the shared communication channel is generated based at least in part on the indication of selection of the workspace.

19. The one or more non-transitory computer readable media of claim 14, wherein the second computing device is not associated with an instance of an application associated with the communication platform, the operations further comprising:

causing a download selectable option to be presented on a display associated with the second computing device, the download selectable option enabling the second user to download the instance of the application on the second computing device;

receiving an indication of selection of the download selectable option;

causing the instance of the application to be downloaded to the second computing device based at least in part on the indication of selection; and receiving a user input via the instance of the application, wherein generating the shared communication channel is based at least in part on the user input.

20. The one or more non-transitory computer readable media of claim 14, wherein the request to generate the invitation is received at a first time, the operations further comprising:

receiving, at a second time prior to the first time and from a third computing device associated with an administrator, an authorization to generate invitations to enable the first user to communicate with at least one other user via the communication platform; and based at least in part on receiving the request for the invitation, generating the invitation.

* * * * *